US009825723B2

(12) United States Patent
Holden et al.

(10) Patent No.: US 9,825,723 B2
(45) Date of Patent: Nov. 21, 2017

(54) METHODS AND SYSTEMS FOR SKEW TOLERANCE IN AND ADVANCED DETECTORS FOR VECTOR SIGNALING CODES FOR CHIP-TO-CHIP COMMUNICATION

(71) Applicant: Kandou Labs, S.A., Lausanne (CH)

(72) Inventors: Brian Holden, Monte Sereno, CA (US); Amin Shokrollahi, Préverenges (CH); Anant Singh, Pully (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 15/084,280

(22) Filed: Mar. 29, 2016

(65) Prior Publication Data

US 2016/0211929 A1 Jul. 21, 2016

Related U.S. Application Data

(63) Continuation of application No. 13/842,740, filed on Mar. 15, 2013, now Pat. No. 9,300,503.

(51) Int. Cl.
*H04B 1/38* (2015.01)
*H04L 27/00* (2006.01)
(Continued)

(52) U.S. Cl.
CPC ............ *H04B 17/364* (2015.01); *H04B 3/00* (2013.01); *H04B 3/02* (2013.01); *H04B 5/0031* (2013.01);
(Continued)

(58) Field of Classification Search
USPC ................ 375/219, 220, 221, 222, 240, 211, 375/240.26, 240.27, 240.28, 254, 257,
(Continued)

(56) References Cited

U.S. PATENT DOCUMENTS 3,196,351 A 7/1965 Slepian
3,636,463 A 1/1972 Ongkiehong
(Continued)

FOREIGN PATENT DOCUMENTS

CN 101478286 7/2009
EP 2039221 2/2013
(Continued)

OTHER PUBLICATIONS

Abbasfar, A., "Generalized Differential Vector Signaling", IEEE International Conference on Communications, ICC '09, (Jun. 14, 2009), pp. 1-5.
(Continued)

*Primary Examiner* — Linda Wong
(74) *Attorney, Agent, or Firm* — Invention Mine LLC

(57) ABSTRACT

Advanced detectors for vector signaling codes are disclosed which utilize multi-input comparators, generalized on-level slicing, reference generation based on maximum swing, and reference generation based on recent values. Vector signaling codes communicate information as groups of symbols which, when transmitted over multiple communications channels, may be received as mixed sets of symbols from different transmission groups due to propagation time variations between channels. Systems and methods are disclosed which compensate receivers and transmitters for these effects and/or utilize codes having increased immunity to such variations, and circuits are described that efficiently implement their component functions.

20 Claims, 14 Drawing Sheets

(51) Int. Cl.
| | |
|---|---|
| *H03K 9/00* | (2006.01) |
| *H04B 17/364* | (2015.01) |
| *H04B 5/00* | (2006.01) |
| *H04L 25/49* | (2006.01) |
| *H04B 3/00* | (2006.01) |
| *H04L 25/03* | (2006.01) |
| *H04L 25/02* | (2006.01) |
| *H04L 1/06* | (2006.01) |
| *H04L 7/04* | (2006.01) |
| *H04L 25/08* | (2006.01) |
| *H04B 3/02* | (2006.01) |

(52) U.S. Cl.
CPC ......... *H04B 5/0081* (2013.01); *H04L 1/0643* (2013.01); *H04L 7/043* (2013.01); *H04L 7/048* (2013.01); *H04L 25/028* (2013.01); *H04L 25/0268* (2013.01); *H04L 25/0272* (2013.01); *H04L 25/0292* (2013.01); *H04L 25/03019* (2013.01); *H04L 25/08* (2013.01); *H04L 25/4925* (2013.01)

(58) Field of Classification Search
USPC ....... 375/258, 259, 285, 284, 278, 286, 288, 375/293, 295, 316, 320, 322, 323, 324, 375/340, 344, 346, 354, 355, 358, 365, 375/364, 363, 362, 361, 359
See application file for complete search history.

(56) References Cited

U.S. PATENT DOCUMENTS

| | | | |
|---|---|---|---|
| 3,939,468 | A | 2/1976 | Mastin |
| 4,163,258 | A | 7/1979 | Ebihara |
| 4,181,967 | A | 1/1980 | Nash |
| 4,206,316 | A | 1/1980 | Burnsweig |
| 4,276,543 | A | 6/1981 | Miller |
| 4,486,739 | A | 12/1984 | Franaszek |
| 4,499,550 | A | 2/1985 | Ray |
| 4,722,084 | A | 1/1988 | Morton |
| 4,772,845 | A | 9/1988 | Scott |
| 4,774,498 | A | 9/1988 | Traa |
| 4,864,303 | A | 9/1989 | Ofek |
| 4,897,657 | A | 1/1990 | Brubaker |
| 4,974,211 | A | 11/1990 | Corl |
| 5,017,924 | A | 5/1991 | Guiberteau |
| 5,053,974 | A | 10/1991 | Penz |
| 5,166,956 | A | 11/1992 | Baltus |
| 5,168,509 | A | 12/1992 | Nakamura |
| 5,266,907 | A | 11/1993 | Dacus |
| 5,283,761 | A | 2/1994 | Gillingham |
| 5,287,305 | A | 2/1994 | Yoshida |
| 5,311,516 | A | 5/1994 | Kuznicki |
| 5,331,320 | A | 7/1994 | Cideciyan |
| 5,412,689 | A | 5/1995 | Chan |
| 5,449,895 | A | 9/1995 | Hecht |
| 5,459,465 | A | 10/1995 | Kagey |
| 5,461,379 | A | 10/1995 | Weinman |
| 5,511,119 | A | 4/1996 | Lechleider |
| 5,553,097 | A | 9/1996 | Dagher |
| 5,566,193 | A | 10/1996 | Cloonan |
| 5,599,550 | A | 2/1997 | Kohlruss |
| 5,626,651 | A | 5/1997 | Dullien |
| 5,629,651 | A | 5/1997 | Mizuno |
| 5,659,353 | A | 8/1997 | Kostreski |
| 5,727,006 | A | 3/1998 | Dreyer |
| 5,748,948 | A | 5/1998 | Yu |
| 5,802,356 | A | 9/1998 | Gaskins |
| 5,825,808 | A | 10/1998 | Hershey |
| 5,856,935 | A | 1/1999 | Moy |
| 5,875,202 | A | 2/1999 | Venters |
| 5,945,935 | A | 8/1999 | Kusumoto |
| 5,949,060 | A | 9/1999 | Schattschneider |
| 5,995,016 | A | 11/1999 | Perino |
| 5,999,016 | A | 12/1999 | McClintock |
| 6,005,895 | A | 12/1999 | Perino |
| 6,084,883 | A | 7/2000 | Norrell |
| 6,119,263 | A | 9/2000 | Mowbray |
| 6,172,634 | B1 | 1/2001 | Leonowich |
| 6,175,230 | B1 | 1/2001 | Hamblin |
| 6,232,908 | B1 | 5/2001 | Nakaigawa |
| 6,278,740 | B1 | 8/2001 | Nordyke |
| 6,316,987 | B1 | 11/2001 | Dally |
| 6,346,907 | B1 | 2/2002 | Dacy |
| 6,359,931 | B1 | 3/2002 | Perino |
| 6,378,073 | B1 | 4/2002 | Davis |
| 6,398,359 | B1 | 6/2002 | Silverbrook |
| 6,404,820 | B1 | 6/2002 | Postol |
| 6,417,737 | B1 | 7/2002 | Moloudi |
| 6,452,420 | B1 | 9/2002 | Wong |
| 6,473,877 | B1 | 10/2002 | Sharma |
| 6,483,828 | B1 | 11/2002 | Balachandran |
| 6,504,875 | B2 | 1/2003 | Perino |
| 6,509,773 | B2 | 1/2003 | Buchwald |
| 6,522,699 | B1 | 2/2003 | Anderson |
| 6,556,628 | B1 | 4/2003 | Poulton |
| 6,563,382 | B1 | 5/2003 | Yang |
| 6,621,427 | B2 | 9/2003 | Greenstreet |
| 6,624,699 | B2 | 9/2003 | Yin |
| 6,650,638 | B1 | 11/2003 | Walker |
| 6,661,355 | B2 | 12/2003 | Cornelius |
| 6,664,355 | B2 | 12/2003 | Kim |
| 6,686,879 | B2 | 2/2004 | Shattil |
| 6,766,342 | B2 | 7/2004 | Kechriotis |
| 6,839,429 | B1 | 1/2005 | Gaikwad |
| 6,839,587 | B2 | 1/2005 | Yonce |
| 6,854,030 | B2 | 2/2005 | Perino |
| 6,865,234 | B1 | 3/2005 | Agazzi |
| 6,865,236 | B1 | 3/2005 | Terry |
| 6,876,317 | B2 * | 4/2005 | Sankaran ............ H03M 7/4006 341/107 |
| 6,898,724 | B2 | 5/2005 | Chang |
| 6,927,709 | B2 | 8/2005 | Kiehl |
| 6,954,492 | B1 | 10/2005 | Williams |
| 6,963,622 | B2 | 11/2005 | Eroz |
| 6,972,701 | B2 | 12/2005 | Jansson |
| 6,973,613 | B2 | 12/2005 | Cypher |
| 6,976,194 | B2 | 12/2005 | Cypher |
| 6,982,954 | B2 | 1/2006 | Dhong |
| 6,990,138 | B2 | 1/2006 | Bejjani |
| 6,993,311 | B2 | 1/2006 | Li |
| 6,999,516 | B1 | 2/2006 | Rajan |
| 7,023,817 | B2 | 4/2006 | Kuffner |
| 7,053,802 | B2 | 5/2006 | Cornelius |
| 7,075,996 | B2 | 7/2006 | Simon |
| 7,085,153 | B2 | 8/2006 | Ferrant |
| 7,085,336 | B2 | 8/2006 | Lee |
| 7,130,944 | B2 | 10/2006 | Perino |
| 7,142,612 | B2 | 11/2006 | Horowitz |
| 7,142,865 | B2 | 11/2006 | Tsai |
| 7,164,631 | B2 | 1/2007 | Tateishi |
| 7,167,019 | B2 | 1/2007 | Broyde |
| 7,180,949 | B2 | 2/2007 | Kleveland |
| 7,184,483 | B2 | 2/2007 | Rajan |
| 7,199,728 | B2 * | 4/2007 | Dally .................. H04L 25/4904 341/100 |
| 7,269,130 | B2 * | 9/2007 | Pitio ........................ H04J 3/08 370/217 |
| 7,269,212 | B1 | 9/2007 | Chau |
| 7,335,976 | B2 | 2/2008 | Chen |
| 7,339,990 | B2 | 3/2008 | Hidaka |
| 7,348,989 | B2 | 3/2008 | Stevens |
| 7,349,484 | B2 | 3/2008 | Stojanovic |
| 7,356,213 | B1 | 4/2008 | Cunningham |
| 7,358,869 | B1 | 4/2008 | Chiarulli |
| 7,362,130 | B2 | 4/2008 | Broyde |
| 7,366,942 | B2 | 4/2008 | Lee |
| 7,370,264 | B2 | 5/2008 | Worley |
| 7,372,390 | B2 | 5/2008 | Yamada |
| 7,389,333 | B2 | 6/2008 | Moore |
| 7,400,276 | B1 | 7/2008 | Sotiriadis |
| 7,428,273 | B2 | 9/2008 | Foster |
| 7,456,778 | B2 | 11/2008 | Werner |

(56) References Cited

U.S. PATENT DOCUMENTS

| | | | |
|---|---|---|---|
| 7,462,956 B2 | 12/2008 | Lan | |
| 7,496,162 B2 | 2/2009 | Srebranig | |
| 7,535,957 B2 | 5/2009 | Ozawa | |
| 7,570,704 B2 | 8/2009 | Nagarajan | |
| 7,599,390 B2 | 10/2009 | Pamarti | |
| 7,616,075 B2 | 11/2009 | Kushiyama | |
| 7,620,116 B2 | 11/2009 | Bessios | |
| 7,633,850 B2 | 12/2009 | Ahn | |
| 7,639,596 B2 | 12/2009 | Cioffi | |
| 7,643,588 B2 | 1/2010 | Visalli | |
| 7,650,525 B1 * | 1/2010 | Chang | H04L 7/0337 375/354 |
| 7,656,321 B2 | 2/2010 | Wang | |
| 7,694,204 B2 | 4/2010 | Schmidt | |
| 7,697,915 B2 | 4/2010 | Behzad | |
| 7,706,456 B2 | 4/2010 | Laroia | |
| 7,706,524 B2 | 4/2010 | Zerbe | |
| 7,746,764 B2 | 6/2010 | Rawlins | |
| 7,787,572 B2 | 8/2010 | Scharf | |
| 7,804,361 B2 | 9/2010 | Lim | |
| 7,808,883 B2 | 10/2010 | Green | |
| 7,841,909 B2 | 11/2010 | Murray | |
| 7,869,497 B2 | 1/2011 | Benvenuto | |
| 7,869,546 B2 | 1/2011 | Tsai | |
| 7,882,413 B2 | 2/2011 | Chen | |
| 7,899,653 B2 | 3/2011 | Hollis | |
| 7,907,676 B2 | 3/2011 | Stojanovic | |
| 7,933,770 B2 | 4/2011 | Kruger | |
| 8,030,999 B2 | 10/2011 | Chatterjee | |
| 8,036,300 B2 | 10/2011 | Evans | |
| 8,050,332 B2 | 11/2011 | Chung | |
| 8,055,095 B2 | 11/2011 | Palotai | |
| 8,064,535 B2 | 11/2011 | Wiley | |
| 8,085,172 B2 | 12/2011 | Li | |
| 8,091,006 B2 | 1/2012 | Prasad | |
| 8,106,806 B2 | 1/2012 | Toyomura | |
| 8,149,906 B2 | 4/2012 | Saito | |
| 8,159,375 B2 | 4/2012 | Abbasfar | |
| 8,159,376 B2 | 4/2012 | Abbasfar | |
| 8,180,931 B2 | 5/2012 | Lee | |
| 8,185,807 B2 | 5/2012 | Oh | |
| 8,199,849 B2 | 6/2012 | Oh | |
| 8,199,863 B2 | 6/2012 | Chen | |
| 8,218,670 B2 | 7/2012 | AbouRjeily | |
| 8,245,094 B2 | 8/2012 | Jiang | |
| 8,253,454 B2 | 8/2012 | Lin | |
| 8,279,094 B2 | 10/2012 | Abbasfar | |
| 8,295,250 B2 | 10/2012 | Gorokhov | |
| 8,295,336 B2 | 10/2012 | Lutz et al. | |
| 8,310,389 B1 | 11/2012 | Chui | |
| 8,365,035 B2 | 1/2013 | Hara | |
| 8,406,315 B2 | 3/2013 | Tsai | |
| 8,429,492 B2 | 4/2013 | Yoon | |
| 8,429,495 B2 | 4/2013 | Przybylski | |
| 8,442,099 B1 | 5/2013 | Sederat | |
| 8,442,210 B2 | 5/2013 | Zerbe | |
| 8,443,223 B2 | 5/2013 | Abbasfar | |
| 8,451,913 B2 | 5/2013 | Oh | |
| 8,462,891 B2 | 6/2013 | Kizer | |
| 8,472,513 B2 | 6/2013 | Malipatil | |
| 8,498,344 B2 | 7/2013 | Wilson | |
| 8,498,368 B1 | 7/2013 | Husted | |
| 8,520,348 B2 | 8/2013 | Dong | |
| 8,520,493 B2 | 8/2013 | Goulahsen | |
| 8,539,318 B2 | 9/2013 | Cronie | |
| 8,547,272 B2 | 10/2013 | Nestler | |
| 8,577,284 B2 | 11/2013 | Seo | |
| 8,578,246 B2 | 11/2013 | Mittelholzer | |
| 8,588,254 B2 | 11/2013 | Diab | |
| 8,588,280 B2 | 11/2013 | Oh | |
| 8,593,305 B1 | 11/2013 | Tajalli | |
| 8,604,879 B2 | 12/2013 | Mourant | |
| 8,638,241 B2 | 1/2014 | Sudhakaran | |
| 8,649,445 B2 | 2/2014 | Cronie | |
| 8,649,460 B2 | 2/2014 | Ware | |
| 8,649,556 B2 | 2/2014 | Wedge | |
| 8,649,840 B2 | 2/2014 | Sheppard, Jr. | |
| 8,687,968 B2 | 4/2014 | Nosaka | |
| 8,711,919 B2 | 4/2014 | Kumar | |
| 8,718,184 B1 | 5/2014 | Cronie | |
| 8,773,964 B2 | 7/2014 | Hsueh | |
| 8,780,687 B2 | 7/2014 | Clausen | |
| 8,782,578 B2 | 7/2014 | Tell | |
| 8,831,440 B2 | 9/2014 | Yu | |
| 8,879,660 B1 | 11/2014 | Peng | |
| 8,897,134 B2 | 11/2014 | Kern | |
| 8,949,693 B2 | 2/2015 | Ordentlich | |
| 8,951,072 B2 | 2/2015 | Hashim | |
| 8,975,948 B2 | 3/2015 | GonzalezDiaz | |
| 8,989,317 B1 | 3/2015 | Holden | |
| 9,015,566 B2 | 4/2015 | Cronie | |
| 9,020,049 B2 | 4/2015 | Schwager | |
| 9,036,764 B1 | 5/2015 | Hossain | |
| 9,059,816 B1 * | 6/2015 | Simpson | H04L 1/0001 |
| 9,069,995 B1 | 6/2015 | Cronie | |
| 9,077,386 B1 | 7/2015 | Holden | |
| 9,083,576 B1 * | 7/2015 | Hormati | H04L 25/4925 |
| 9,093,791 B2 | 7/2015 | Liang | |
| 9,100,232 B1 | 8/2015 | Hormati | |
| 9,106,465 B2 | 8/2015 | Walter | |
| 9,124,557 B2 | 9/2015 | Fox | |
| 9,148,087 B1 | 9/2015 | Tajalli | |
| 9,152,495 B2 | 10/2015 | Losh | |
| 9,165,615 B2 | 10/2015 | Amirkhany | |
| 9,172,412 B2 | 10/2015 | Kim | |
| 9,183,085 B1 | 11/2015 | Northcott | |
| 9,197,470 B2 | 11/2015 | Okunev | |
| 9,281,785 B2 | 3/2016 | Sjoland | |
| 9,331,962 B2 | 5/2016 | Lida | |
| 9,362,974 B2 | 6/2016 | Fox | |
| 9,363,114 B2 | 6/2016 | Shokrollahi | |
| 9,374,250 B1 | 6/2016 | Musah | |
| 2002/0044316 A1 | 4/2002 | Myers | |
| 2002/0057292 A1 | 5/2002 | Holtz | |
| 2002/0057592 A1 | 5/2002 | Robb | |
| 2002/0154633 A1 | 10/2002 | Shin | |
| 2003/0016770 A1 | 1/2003 | Trans | |
| 2003/0086366 A1 | 5/2003 | Branlund | |
| 2003/0146783 A1 | 8/2003 | Bandy | |
| 2004/0027185 A1 | 2/2004 | Fiedler | |
| 2004/0146117 A1 | 7/2004 | Subramaniam | |
| 2004/0161019 A1 | 8/2004 | Raghavan | |
| 2004/0169529 A1 | 9/2004 | Afghahi | |
| 2005/0134380 A1 | 6/2005 | Nairn | |
| 2005/0174841 A1 | 8/2005 | Ho | |
| 2005/0213686 A1 | 9/2005 | Love | |
| 2006/0097786 A1 | 5/2006 | Su | |
| 2006/0103463 A1 | 5/2006 | Lee | |
| 2006/0126751 A1 | 6/2006 | Bessios | |
| 2007/0194848 A1 | 8/2007 | Bardsley | |
| 2007/0204205 A1 * | 8/2007 | Niu | H03M 13/356 714/780 |
| 2007/0263711 A1 | 11/2007 | TheodorKramer | |
| 2007/0265533 A1 | 11/2007 | Tran | |
| 2008/0007367 A1 | 1/2008 | Kim | |
| 2008/0013622 A1 | 1/2008 | Bao | |
| 2008/0042703 A1 * | 2/2008 | Sha | H03L 7/0812 327/158 |
| 2008/0104374 A1 | 5/2008 | Mohamed | |
| 2008/0159448 A1 | 7/2008 | Anim-Appiah | |
| 2008/0192621 A1 | 8/2008 | Suehiro | |
| 2008/0317188 A1 | 12/2008 | Staszewski | |
| 2009/0059782 A1 | 3/2009 | Cole | |
| 2009/0138646 A1 * | 5/2009 | Ware | G06F 13/1684 710/308 |
| 2009/0195281 A1 | 8/2009 | Tamura | |
| 2009/0228767 A1 | 9/2009 | Oh | |
| 2009/0251222 A1 | 10/2009 | Khorram | |
| 2009/0316730 A1 | 12/2009 | Feng | |
| 2009/0323864 A1 | 12/2009 | Tired | |
| 2010/0023838 A1 | 1/2010 | Shen | |
| 2010/0046644 A1 | 2/2010 | Mazet | |
| 2010/0180143 A1 | 7/2010 | Ware | |
| 2010/0215112 A1 | 8/2010 | Tsai | |

(56) References Cited

U.S. PATENT DOCUMENTS

| | | | |
|---|---|---|---|
| 2010/0235673 A1 | 9/2010 | Abbasfar | |
| 2010/0296556 A1 | 11/2010 | Rave | |
| 2010/0309964 A1 | 12/2010 | Oh | |
| 2011/0051854 A1* | 3/2011 | Kizer | H04L 25/4919 375/340 |
| 2011/0072330 A1 | 3/2011 | Kolze | |
| 2011/0150495 A1 | 6/2011 | Nosaka | |
| 2011/0291758 A1 | 12/2011 | Hsieh | |
| 2011/0299555 A1 | 12/2011 | Cronie | |
| 2012/0008662 A1 | 1/2012 | Gardiner | |
| 2012/0152901 A1 | 6/2012 | Nagorny | |
| 2012/0161945 A1 | 6/2012 | Single | |
| 2012/0213299 A1* | 8/2012 | Cronie | H04L 1/0041 375/259 |
| 2012/0230686 A1* | 9/2012 | Tang | H04L 27/2662 398/43 |
| 2013/0010892 A1 | 1/2013 | Cronie | |
| 2013/0049863 A1 | 2/2013 | Chiu | |
| 2013/0147553 A1 | 6/2013 | Iwamoto | |
| 2013/0188656 A1* | 7/2013 | Ferraiolo | G06F 13/4204 370/503 |
| 2013/0195155 A1 | 8/2013 | Pan | |
| 2013/0229294 A1 | 9/2013 | Matsuno | |
| 2013/0315501 A1* | 11/2013 | Atanassov | G06T 5/001 382/275 |
| 2014/0177645 A1 | 6/2014 | Cronie | |
| 2014/0198841 A1 | 7/2014 | George | |
| 2014/0226455 A1 | 8/2014 | Schumacher | |
| 2015/0010044 A1 | 1/2015 | Zhang | |
| 2015/0078479 A1 | 3/2015 | Whitby-Strevens | |
| 2015/0146771 A1 | 5/2015 | Walter | |
| 2015/0199543 A1 | 7/2015 | Winoto | |
| 2015/0222458 A1 | 8/2015 | Hormati | |
| 2015/0249559 A1 | 9/2015 | Shokrollahi | |
| 2015/0333940 A1 | 11/2015 | Shokrollahi | |
| 2015/0380087 A1 | 12/2015 | Mittelholzer | |
| 2015/0381232 A1 | 12/2015 | Ulrich | |
| 2016/0020796 A1 | 1/2016 | Hormati | |
| 2016/0020824 A1 | 1/2016 | Ulrich | |
| 2016/0036616 A1 | 2/2016 | Holden | |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

Clayton, P., "Introduction to Electromagnetic Compatibility", Wiley-Interscience, 2006.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Healey, A., et al., "A Comparison of 25 Gbps NRZ & PAM-4 Modulation used in Legacy & Premium Backplane Channels", DesignCon 2012, 16 pages.

International Search Report and Written Opinion for PCT/EP2011/059279 dated Sep. 22, 2011.

International Search Report and Written Opinion for PCT/EP2011/074219 dated Jul. 4, 2012.

International Search Report and Written Opinion for PCT/EP2012/052767 dated May 11, 2012.

International Search Report and Written Opinion for PCT/US14/052986 dated Nov. 24, 2014.

International Search Report and Written Opinion from PCT/US2014/034220 dated Aug. 21, 2014.

International Search Report and Written Opinion of the International Searching Authority, dated Jul. 14, 2011 in International Patent Application S.N. PCT/EP2011/002170, 10 pages.

International Search Report and Written Opinion of the International Searching Authority, dated Nov. 5, 2012, in International Patent Application S.N. PCT/EP2012/052767, 7 pages.

International Search Report for PCT/US2014/053563, dated Nov. 11, 2014, 2 pages.

Notification of Transmittal of The International Search Report and The Written Opinion of the International Searching Authority, or The Declaration for PCT/EP2013/002681, dated Feb. 25, 2014, 15 pages.

Poulton, et al., "Multiwire Differential Signaling", UNC-CH Department of Computer Science Version 1.1, Aug. 6, 2003.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Skliar et al., A Method for the Analysis of Signals: the Square-Wave Method, Mar. 2008, Revista de Matematica: Teoria y Aplicationes, pp. 109-129.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Transactions on Computers, vol. 52, No. 5, May 2003, pp. 558-571.

Wang et al., "Applying CDMA Technique to Network-on-Chip" IEEE Transactions on Very Large Scale Integration (VLSI) Systems, vol. 15, No. 10 (Oct. 1, 2007), pp. 1091-1100.

"Introduction to: Analog Computers and the DSPACE System," Course Material ECE 5230 Spring 2008, Utah State University, www.coursehero.com, 12 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http.//www.retrothing.com/2006/08/classic_analog_.html.

Jiang, A., et al., "Rank Modulation for Flash Memories", IEEE Transactions of Information Theory, Jun. 2006, vol. 55, No. 6, pp. 2659-2673.

Notification of Transmittal of International Search Report and The Written Opinion of the International Searching Authority, for PCT/US2015/018363, dated Jun. 18, 2015, 13 pages.

Notification of Transmittal of The International Search Report and The Written Opinion of the International Searching Authority, or The Declaration, dated Mar. 3, 2015, for PCT/US2014/066893, 9 pages.

Notification of Transmittal of The International Search Report and The Written Opinion of the International Searching Authority, or the Declaration, for PCT/US2014/015840, dated May 20, 2014. 11 pages.

(56) References Cited

OTHER PUBLICATIONS

Notification of Transmittal of The International Search Report and The Written Opinion of the International Searching Authority, or the Declaration, for PCT/US2014/043965, dated Oct. 22, 2014, 10 pages.
Oh, et al., Pseudo-Differential Vector Signaling for Noise Reduction in Single-Ended Signaling, DesignCon 2009.
Schneider, J., et al., "ELEC301 Project: Building an Analog Computer," Dec. 19, 1999, 8 pages, http://www.clear.rice.edu/elec301/Projects99/anlgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Zouhair Ben-Neticha et al, "The streTched-Golay and other codes for high-SNR finite-delay quantization of the Gaussian source at ½ Bit per sample", IEEE Transactions on Communications, vol. 38, No. 12 Dec. 1, 1990, pp. 2089-2093, XP000203339, ISSN: 0090-6678, DOI: 10.1109/26.64647.
Loh, M., et al., "A 3×9 Gb/s Shared, All-Digital CDR for High-Speed, High-Density I/O" , Matthew Loh, IEEE Journal of Solid-State Circuits, Vo. 47, No. 3, Mar. 2012.
Notification of Transmittal of the International Search Report and the Written Opinion of the International Searching Authority, or the Declaration, for PCT/US2015/037466, dated Nov. 19, 2015.
Notification of Transmittal of the International Search Report and The Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.
Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.
Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

* cited by examiner

Codewords and Comparator output

FIG. 2A

| Codewords | | | | | | Comparator output | | | | | |
|---|---|---|---|---|---|---|---|---|---|---|---|
| 1 | 0 | 0 | 0 | -1 | → | U | -1 | 1 | 1 | 1 | -1 |
| 1 | 0 | 0 | -1 | 0 | → | -1 | 1 | 1 | 1 | 1 | 1 |
| 1 | 0 | -1 | 0 | 0 | → | 1 | U | 1 | 1 | 1 | 1 |
| 1 | -1 | 0 | 0 | 0 | → | -1 | -1 | 1 | 1 | 1 | 1 |
| 0 | 1 | 0 | 0 | -1 | → | 1 | 1 | U | -1 | 1 | -1 |
| 0 | 1 | 0 | -1 | 0 | → | 1 | 1 | 1 | U | -1 | -1 |
| 0 | 1 | -1 | 0 | 0 | → | 1 | 1 | -1 | 1 | U | -1 |
| 0 | 0 | 1 | 0 | -1 | → | -1 | -1 | 1 | -1 | 1 | -1 |
| 0 | 0 | 1 | -1 | 0 | → | -1 | 1 | 1 | -1 | -1 | U |
| 0 | 0 | 0 | 1 | -1 | → | 1 | -1 | -1 | -1 | 1 | -1 |
| 0 | 0 | 0 | -1 | 1 | → | -1 | 1 | 1 | 1 | -1 | 1 |
| 0 | 0 | -1 | 1 | 0 | → | 1 | -1 | -1 | 1 | 1 | U |
| 0 | 0 | -1 | 0 | 1 | → | 1 | 1 | -1 | 1 | -1 | 1 |
| 0 | -1 | 1 | 0 | 0 | → | -1 | -1 | 1 | -1 | U | 1 |
| 0 | -1 | 0 | 1 | 0 | → | -1 | -1 | -1 | U | 1 | 1 |
| 0 | -1 | 0 | 0 | 1 | → | -1 | -1 | U | 1 | -1 | 1 |
| -1 | 1 | 0 | 0 | 0 | → | 1 | 1 | -1 | -1 | -1 | -1 |
| -1 | 0 | 1 | 0 | 0 | → | -1 | U | -1 | -1 | -1 | -1 |
| -1 | 0 | 0 | 1 | 0 | → | 1 | -1 | -1 | -1 | -1 | -1 |
| -1 | 0 | 0 | 0 | 1 | → | U | 1 | -1 | -1 | -1 | 1 |

FIG. 2B

| Codewords | | | | | Comparator output | | | | | | | |
|---|---|---|---|---|---|---|---|---|---|---|---|---|
| 1 | 0 | 0 | -1 | → | 1 | 1 | U | 1 | U | 1 | 1 | -1 |
| 1 | 0 | -1 | 0 | → | -1 | 1 | 1 | U | 1 | U | 1 | -1 |
| 1 | -1 | 0 | 0 | → | -1 | U | 1 | 1 | 1 | 1 | U | 1 |
| 0 | 1 | 0 | -1 | → | 1 | 1 | -1 | 1 | -1 | -1 | 1 | -1 |
| 0 | 1 | -1 | 0 | → | U | 1 | 1 | -1 | -1 | -1 | 1 | -1 |
| 0 | 0 | 1 | -1 | → | 1 | -1 | -1 | 1 | -1 | 1 | 1 | U |
| 0 | 0 | -1 | 1 | → | -1 | 1 | 1 | -1 | 1 | -1 | -1 | U |
| 0 | -1 | 1 | 0 | → | U | -1 | -1 | 1 | 1 | 1 | -1 | 1 |
| 0 | -1 | 0 | 1 | → | -1 | -1 | 1 | -1 | 1 | 1 | -1 | 1 |
| -1 | 1 | 0 | 0 | → | 1 | U | -1 | -1 | -1 | -1 | U | -1 |
| -1 | 0 | 1 | 0 | → | 1 | -1 | -1 | U | -1 | U | -1 | 1 |
| -1 | 0 | 0 | 1 | → | -1 | -1 | U | -1 | U | -1 | -1 | 1 |
| 1 | 1 | -1 | -1 | → | 1 | 1 | 1 | 1 | -1 | -1 | 1 | -1 |
| 1 | -1 | 1 | -1 | → | 1 | -1 | -1 | 1 | 1 | 1 | 1 | 1 |
| 1 | -1 | -1 | 1 | → | -1 | 1 | -1 | 1 | 1 | -1 | 1 | 1 |
| -1 | 1 | 1 | -1 | → | 1 | -1 | -1 | 1 | -1 | 1 | 1 | -1 |
| -1 | 1 | -1 | 1 | → | -1 | 1 | 1 | -1 | -1 | -1 | -1 | 1 |
| -1 | -1 | 1 | 1 | → | -1 | -1 | -1 | -1 | 1 | 1 | -1 | 1 |

METHODS AND SYSTEMS FOR SKEW TOLERANCE IN AND ADVANCED DETECTORS FOR VECTOR SIGNALING CODES FOR CHIP-TO-CHIP COMMUNICATION

CROSS-REFERENCES TO PRIORITY AND RELATED APPLICATIONS

This application is a Continuation of Ser. No. 13/842,740, entitled "METHODS AND SYSTEMS FOR SKEW TOLERANCE IN AND ADVANCED DETECTORS FOR VECTOR SIGNALING CODES FOR CHIP-TO-CHIP COMMUNICATION", filed Mar. 15, 2013, reference of which is hereby incorporated in its entirety.

The following references are herein incorporated by reference in their entirety for all purposes:

U.S. Patent Publication 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III"); and U.S. patent application Ser. No. 13/463,742, filed May 3, 2012, naming Harm Cronie and Amin Shokrollahi, entitled "Finite State Encoders and Decoders for Vector Signaling Codes" (hereafter called "Cronie IV").

U.S. patent application Ser. No. 13/603,107, filed Sep. 9, 2012, naming Brian Holden and Amin Shokrollahi, entitled "Methods and Systems for Selection of Unions of Vector Signaling Codes for Power and Pin Efficient Chip-To-Chip Communication" (hereinafter called "Holden I").

U.S. patent application Ser. No. 13/671,426, filed Nov. 7, 2012, naming Brian Holden and Amin Shokrollahi, entitled "Crossbar Switch Decoder for Vector Signaling Codes" (hereinafter called "Holden II").

The following additional references to prior art have been cited in this application:

[Buchwald1] U.S. Pat. No. 6,509,773, filed Apr. 30, 2001 by Buchwald et al., entitled "Phase interpolator device and method."

BACKGROUND

In communication systems, information may be transmitted from one physical location to another. Furthermore, it is typically desirable that the transport of this information is reliable, is fast and consumes a minimal amount of resources. One of the most common information transfer mediums is the serial communications link, which may be based on a single wire circuit relative to ground or other common reference, multiple such circuits relative to ground or other common reference, or multiple circuits used in relation to each other. An example of the latter utilizes differential signaling (DS). Differential signaling operates by sending a signal on one wire and the opposite of that signal on a paired wire; the signal information is represented by the difference between the wires rather than their absolute values relative to ground or other fixed reference.

Differential signaling enhances the recoverability of the original signal at the receiver, over single ended signaling (SES), by cancelling crosstalk and other common-mode noise, but a side benefit of the technique is that the Simultaneous Switching Noise (SSN) transients generated by the two signals together is nearly zero; if both outputs are presented with an identical load, the transmit demand on its power supply will be constant, regardless of the data being sent. Any induced currents produced by terminating the differential lines in the receiver will similarly cancel out, minimizing noise induction into the receiving system.

There are a number of signaling methods that maintain the desirable properties of DS while increasing pin-efficiency over DS. Many of these attempts operate on more than two wires simultaneously, using binary signals on each wire, but mapping information in groups of bits.

Vector signaling is a method of signaling. With vector signaling, pluralities of signals on a plurality of wires are considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors.

With non-binary vector signaling, each component has a coordinate value that is a selection from a set of more than two possible values. A "non-binary vector signaling code" refers to a mapping and/or set of rules to map information bits to non-binary vectors.

Examples of vector signaling methods are described in Cronie I, Cronie II, Cronie III, and Cronie IV.

While non-binary vector signaling methods can provide substantial improvements regarding the tradeoff of pin-efficiency, power efficiency and noise resilience as compared to traditional signaling methods, there are some applications wherein additional improvements are possible.

BRIEF SUMMARY

In accordance with at least one embodiment of the invention, processes and apparatuses provide for transmitting data over physical channels such that the signals transmitted are resilient to common mode noise, do not require a common reference at the transmission and reception points, and can produce a pin-efficiency of 100% with relatively low power dissipation for encoding and decoding. Corresponding decoders at reception points are also disclosed. In some embodiments of the invention, different voltage, current, etc. levels are used for signaling and more than two levels may be used, such as a ternary sparse signaling code wherein each wire signal has one of three values.

Hardware elements may be provided to provide storage for symbols of input information used for selecting code words, processing hardware to convert symbols to signals, parsing symbols into separate partitions, storing results, and providing the partitions in sequence as signals. Various embodiments are given with reference to specific hardware implementations of small area and low power dissipation. Embodiments are described which discriminate between different subsets of code words in a power and pin efficient matter.

In accordance with at least one embodiment of the invention, advanced methods of detection for vector signaling codes are described, including vector signaling detection by means of generalized comparators and vector signaling detection by means of generalized on-level slicing. In accordance with at least one embodiment of the invention, advanced methods of communicating vector signaling codes are also presented, including vector signaling utilizing generalized pseudo differential signaling and vector signaling utilizing temporal signaling.

In accordance with at least one embodiment of the invention, techniques are presented to compensate for channel skew, including receive-side sub unit interval analog skew compensation, receive-side skew compensation utilizing generalized comparators, receive-side skew compensation utilizing temporal signaling, and transmitter-side skew compensation. In accordance with at least one embodiment of the invention, techniques are described which avoid the impact of channel skew, including receive-side skew avoidance utilizing generalized pseudo-differential signaling, and receive-side skew avoidance utilizing temporal signaling.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

FIGS. 2A and 2B illustrate the available codewords and the respective multi-input comparator outputs for two examples provided in accordance with at least one embodiment of the invention.

DETAILED DESCRIPTION

Figure 1A:
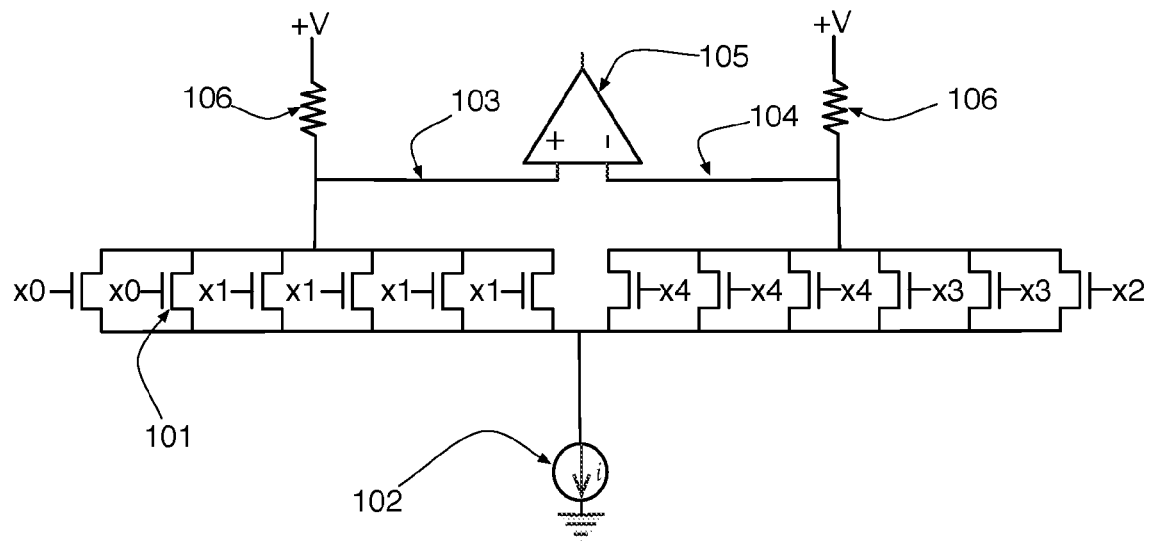
FIGS. 1A and 1B are schematic diagrams of a multi-input comparator, in accordance with at least one embodiment of the invention.

This disclosure is organized in two parts. The first part describes several types of advanced detectors for vector signaling communication links. The second part describes several types of skew avoidance and skew tolerance circuits for vector signaling communications links.

Advanced Detectors for Vector Signaling

Cronie I, Cronie II, and Holden I describe methods of detecting the symbols that have been sent on a vector signaling link. This disclosure describes several additional methods.

Vector Signaling Detection by Means of Multi-Input Comparators

A detection mechanism called maximum-likelihood decoding has been described for use where permutation modulation coding is used for chip-to-chip communication. Holden I teaches a decoder using comparators that compare signal values on two communication wires, producing results that inform sorting or ranking actions within such decoder.

The operation of such a comparator can be succinctly described using the "sign" notation, given in the following: $sign(x)=+1$ if $x>0$, $sign(x)=-1$ if $x<0$, and $sign(x)$ is undefined if $x=0$. That is, if two values entering a comparator are equal, or close to equal, then the value output by the comparator can be a +1 or a −1, and it is not clear a-priori which of these values is output. Such comparators are called "simple comparators" hereinafter.

In some applications, it may be the case that simple comparators are not sufficient to detect the codewords of a vector signaling code. As an example, consider the union of two PM-codes, one generated as permutations of the vector (1,0,0,−1), and one generated as permutations of the vector (1,1,−1,−1). This union contains 18 codewords, whereas each constituent PM-code contains at most 12 codewords, versus the 16 unique codewords needed to represent a four-bit data value. It is therefore not possible to transmit 4 bits on 4 wires using one PM-code alone, whereas with the union of these two PM-codes a full pin-efficient transmission on 4 wires is possible. Such transmission will be feasible if detection of the codewords can be done with efficient circuitry. It is easy to see that even a full set of 6 simple comparators between pairs of wires is not sufficient to detect a codeword, as those comparisons give no information as to which of the two constituent PM-codes include the received word.

In an application where the values on n communication wires need to be ranked, the number of simple comparators needed is n*(n−1)/2, the number of all un-ordered pairs of integers in the range 1,2, . . . , n. In some applications this number may be too large. For example, where n is 10, the number of simple comparators required is 45, which may be too large to permit implementation in a given application.

For these reasons, it is important to devise circuits that can be implemented more efficiently than those requiring unacceptable numbers of simple comparators, as well as enabling detection of codewords that would otherwise be undetectable. Such circuits will be described, using an element that hereinafter is termed a multi-input comparator.

A multi-input comparator with coefficients $a_0, a_1, \ldots, a_{m-1}$ is a circuit that accepts as its input a vector $(x_0, x_1, \ldots, x_{m-1})$ and outputs $$\text{sign}(a_0{}^*x_0 + \ldots + a_{m-1}{}^*x_{m-1}), \quad \text{Eqn. 1}$$

with the definition of the sign-function given above. As such, a simple comparator may be seen to be a two input multi-input comparator with coefficients 1 and −1, hence may be considered to be a special case of a multi-input comparator.

In accordance with at least one embodiment of the invention, the coefficients of a multi-input comparator are integers. In such cases, one circuit implementation of a multi-input comparator is given with reference to FIG. 1a, showing coefficients of 2, 4, −1, −2, −3 for the input values x0 through x4 respectively. In this example, each of the twelve input transistors 101 are identical, representing an extended differential input stage sharing current source 102, followed by differential comparator stage 105. As all transistors 101 are identical, the contributions of inputs x0 and x1 to positive summing node 103, and of inputs x2, x3, and x4 to negative summing node 104 are weighted in proportion to the number of input transistors controlled by each such input. Resistors 106 are shown as passive pull-ups on summing nodes 103 and 104; in some embodiments their function will be incorporated in that of differential comparator 105. Assuming sufficiently high gain in differential comparator 105 to obtain a digital result, its output represents the sign( ) operation taken on the difference between positive summing node 103 and negative summing node 104. Thus, the circuit of FIG. 1A implements Eqn. 1, where inputs with positive coefficients are attached to transistors 101 associated with positive summing node 103, and inputs with negative coefficients are attached to transistors 101 associated with negative summing node 104, the coefficient values being represented by the number of identical input transistors 101 used for each input.

Figure 1B:
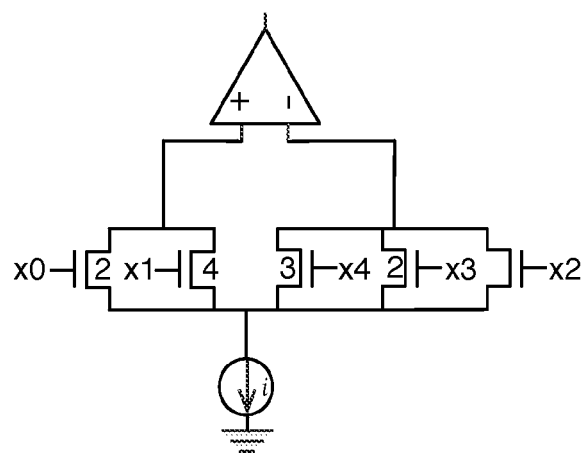

Another multi-input comparator also having the same coefficients is illustrated using a simplified notation in FIG. 1B, where for every input the multiplicity of that input in terms of transistors is a given as a number adjacent to the corresponding transistor. In accordance with at least one embodiment of the invention, such multiple paralleled transistors for the same input may be implemented as single transistors having an equivalently scaled channel width, transfer current, or comparable functional characteristics as such multiple paralleled transistors. Another embodiment of the invention produces equivalent results dynamically, with inputs controlling the amount of charge on capacitors scaled in proportion to input weights, which are then discharged into a summing node.

A multi-input comparator is common mode resistant if the sum of all its coefficients is zero. It is easy to see that if a multi-input comparator is common mode resistant, then simultaneously increasing the values of its inputs by the same amount will not result in any change of the output of the multi-input comparator.

Multi-input comparators may be susceptible to more thermal noise than simple comparators. If the inputs of a multi-input comparator are independently changed by additive white Gaussian noise of mean 0 and variance $\sigma^2$, the output of the comparator is perturbed by additive white Gaussian noise of mean 0 and variance $$\sigma^2(a_0{}^2 30 \ldots + a_{m-1}{}^2) \quad \text{Eqn. 2}$$

If, for a given input $(x_0, x_1, x_2, \ldots, x_{m-1})$ and $(y_0, y_1, y_2, \ldots, y_{t-1})$ the value $$\alpha = \left| \frac{a_0 x_0 + \ldots + a_{m-1} x_{m-1}}{(a_0^2 + \ldots + a_{m-1}^2)} \right| \quad \text{Eqn. 3}$$

is nonzero, then the error probability of this multi-input comparator is $Q_\sigma(\alpha)$, wherein $Q_\sigma(x)$ is the probability that a normal random variable of mean 0 and variance $\sigma^2$ has a value larger than or equal to x. Hereinafter we call $\alpha$ the "sensitivity" of the multi-input comparator with respect to its input. Note that by definition sensitivity is nonzero, i.e. if the input of a multi-input comparator is such that the value $\alpha$ as defined in Eqn. 3 is zero, then the sensitivity of the comparator with respect to that particular input is "undefined."

A set S of multi-input comparators is said to "detect" a vector signaling code C if the following holds: For any two codewords c and d, there is a multi-input comparator in the set S such that the value of that comparator on both c and d is not undefined, and the values are different. This means that the codewords of the vector signaling code are uniquely determined by the outputs of all the multi-input comparators in S when the codeword is used as the input. If a set S of multi-input comparators detects the vector signaling code C, then we define the "minimum sensitivity" of S with respect to C as the minimum sensitivity of any of the comparators applied to any of the codewords, provided that the sensitivity is defined. The notion of minimum sensitivity stands for the maximum amount of thermal noise that can be applied to the codewords while guaranteeing a given detection error probability. Several examples below will illustrate this notion.

In accordance with at least one embodiment of the invention, a set of 6 multi-input comparators with the coefficients of Table 1 are shown to detect the vector signaling PM-code generated as permutations of the vector (1,0,0,0,−1). A minimum of 10 simple comparators would be needed to provide the same detection capability, thus using multi-input comparators reduces the number of comparators by a factor of almost 2.

TABLE 1 coefficient set to detect code of FIG. 2a

| | Coefficients | | | | |
|---|---|---|---|---|---|
| | $a_0$ | $a_1$ | $a_2$ | $a_3$ | $a_4$ |
| Comparator 1 | −1 | 5 | −5 | 2 | −1 |
| Comparator 2 | −1 | 5 | −1 | −5 | 2 |
| Comparator 3 | 5 | −1 | 2 | −5 | −1 |

TABLE 1-continued coefficient set to detect code of FIG. 2a

| | Coefficients | | | | |
|---|---|---|---|---|---|
| | $a_0$ | $a_1$ | $a_2$ | $a_3$ | $a_4$ |
| Comparator 4 | 5 | −1 | 5 | −1 | 2 |
| Comparator 5 | 5 | −1 | −1 | 2 | −5 |
| Comparator 6 | 2 | −5 | −1 | −1 | 5 |

The 20 codewords of this PM-code are given in the leftmost five columns of FIG. 2A. It may be confirmed that this set of comparators detects the code by looking at the rightmost six columns of FIG. 2A, where comparator outputs are shown as 1, −1, or U for "undefined." For example, codewords (1,0,0,0,−1) and (1,0,−1,0,0) are distinguished by comparator number 6, since the output of this comparator for the first codeword is −1, while it is +1 for the second codeword. No other comparator distinguishes these two codewords. Similarly, codewords (0,1,−1,0,0) and (0,−1,0, 0,1) are distinguished by comparators 1, 2, and 6. The outputs of these comparators for the first codeword are 1, 1, and −1, while the outputs for the second codeword are −1, −1, and 1. The minimum sensitivity of this set of comparators for this code can be computed as follows: the minimum nonzero value of $a_0x_0+ \ldots +a_4x_4$ for all the comparators and all the codewords is 3. Therefore the minimum sensitivity of this set of comparators is $3/\sqrt{56}$.

In accordance with at least one embodiment of the invention, a set of 8 multi-input comparators with the coefficients of Table 2 are shown to detect the vector signaling code obtained as the union of the PM-code generated as permutations of the vector (1,0,0,−1) and the PM-code generated as permutations of the vector (1,1,−1,−1). Note that it is not possible to detect this code using simple comparators alone.

TABLE 2 coefficient set to detect code of FIG. 2b

| | Coefficients | | | |
|---|---|---|---|---|
| | $a_0$ | $a_1$ | $a_2$ | $a_3$ |
| Comparator 1 | −1 | 2 | 2 | −3 |
| Comparator 2 | 2 | 2 | −3 | −1 |
| Comparator 3 | 2 | −1 | −3 | 2 |
| Comparator 4 | 2 | −1 | 2 | −3 |
| Comparator 5 | 2 | −3 | −1 | 2 |
| Comparator 6 | 2 | −3 | 2 | −1 |
| Comparator 7 | 2 | 2 | −1 | −3 |
| Comparator 8 | −1 | −3 | 2 | 2 |

The codewords of this code are given by the leftmost four columns of FIG. 2B. Examination of the outputs of these comparators as shown in the rightmost eight columns of 2B confirms that these comparators detect the code. For example, codewords (1,0,0,−1) and (−1,1,−1,1) are distinguished by comparators 1, 6, and 7: the outputs of these comparators on the first codeword are 1, 1, and 1, respectively, whereas these outputs for the second codeword are −1, −1, and −1. The minimum sensitivity of this set of comparators is computed as follows: the minimum nonzero value of $a_0x_0+ \ldots +a_3x_{34}$ for all the comparators and all the codewords is 2. Therefore the minimum sensitivity of this set of comparators is $2/\sqrt{18}$. With respect to thermal noise, this code performs exactly the same way as PAM-4 would, but unlike PAM-4 signaling, it does not suffer from reference generation noise.

In accordance with at least one embodiment of the invention, a set of 8 comparators with the coefficients of Table 3 are also shown to detect the same code as used in the previous example.

TABLE 3 alternative coefficient set to detect code of FIG. 2B

| | Coefficients | | | |
|---|---|---|---|---|
| | $a_0$ | $a_1$ | $a_2$ | $a_3$ |
| Comparator 1 | −1 | 3 | 3 | −5 |
| Comparator 2 | 3 | 3 | −5 | −1 |
| Comparator 3 | 3 | −1 | −5 | 3 |
| Comparator 4 | 3 | −1 | 3 | −5 |
| Comparator 5 | 3 | −5 | −1 | 3 |
| Comparator 6 | 3 | −5 | 3 | −1 |
| Comparator 7 | 3 | 3 | −1 | −5 |
| Comparator 8 | −1 | −5 | 3 | 3 |

These comparators indeed detect the code, as can be seen by a simple calculation using the codewords given by the leftmost four columns of FIG. 2B. Because of the larger coefficients of Table 3 versus Table 2, a multi-input comparator embodiment with the coefficients of Table 3 using individual paralleled transistors would require more transistors than a multi-input comparator embodiment with the coefficients of Table 2. However, the minimum sensitivity is much better with the coefficients of Table 3 as it is $4/\sqrt{44}$. This is 2.5 dB better than the performance of PAM-4 signaling.

In situations where thermal noise is not a big issue the behavior of these signaling methods is significantly better than that of PAM-4 since the alphabet they use is ternary rather than quaternary. In practice, this means that the eye diagrams observed at the receiver have a larger vertical opening. This means that these schemes would not require as much equalization as PAM-4 signaling, and hence require less power.

Using multi-input comparators, it is thus possible to construct signaling schemes with simple detection mechanisms that have at least the same pin-efficiency as PAM-4, but perform much better in practice in terms of noise resilience.

Vector Signaling Utilizing Generalized on-Level Slicing

A further embodiment of detection of vector signaling codes uses a generalized set of slicers that have their slicing point set to the levels of differences between symbols on the wires. This is a specific special case of the use of multi-input comparators.

Traditional single ended communications receivers use a reference level that is placed at or near the vertical mid-point of the eye. For example, if the symbol levels for a single-ended link are 0 and 1 volt, the reference level is set at ½ volts. If the receive level is greater than ½ volt, the receiver decides that the received symbol level is greater than the reference, then a one is received. If the received symbol level is less than ½ volt, then the receiver decides that a zero is received. A more sophisticated single ended receiver generates a reference signal that is at the mid-point of the range of actual received input values averaged over a moderate period of time. This method allows the receiver to be robust to a variety of impairments on the link, but adds complexity.

Differential receivers use the complementary signal that is sent on the opposite wire of the differential pair as the reference. A differential receiver uses a differential amplifier at the input of said receiver to determine which of the input signals is higher than the other signal. The resulting difference value is amplified. Said amplified signal is then compared against a fixed reference, typically set at a value that represents the midpoint of the amplified signal. Said reference is typically related only to the operating parameters of said input differential amplifier circuit.

Vector signaling code receivers, as taught by Holden I and Holden II, typically compare the signals that are on the input wires, as an example, using six differential amplifiers across each combination of four input wires. An example vector signaling code transmitter may emit three-level symbols, also known as ternary symbols, on each of the four wires. Thus, each of said differential amplifiers compares two ternary symbols. When two ternary symbols are compared, the difference has five possible values. For example, if the ternary symbols have values of +1, 0, −1, the difference will have the possible values+2, +1, 0, −1, −2. The differential amplifier plus slicer circuit used in the example vector signaling code receiver output a 1 signal when the difference is +2 or +1, an indeterminate value when the difference is 0, and a 0 value when the difference is −1 or −2, these outputs being presented as inputs to a decoder circuit that can use the slicer outputs to discriminate between the input codewords that must have been sent to produce that slicer output. Said decoder can work around the uncertainty caused by the said indeterminate values because of the design of the code which, among other properties, has its Hamming distance set to a minimum of two. The receiver has a "global error" of one bit because if it cannot distinguish between inputs that are at the same value, but the code can distinguish between any two input conditions that have less than two bits of error. Since the differential plus slicer circuit does not need to distinguish between any three adjacent input levels, the noise tolerance of the receiver is also improved.

More information can be obtained about the input conditions by extending this concept. By adding or subtracting offsets equal to one symbol level difference from one of the two input signals before taking the input signal difference, additional knowledge about the input can be derived. The use of said additional knowledge is dependent on the codes that the decoder is trying to discriminate. In general, codewords with many non-zero values are most easily discriminated using this technique.

Example of the Use of Generalized on-Level Slicing

As an example, an embodiment of generalized on-level slicing is applied to a four wire ternary vector signaling system where the input wires are labeled A, B, C and D. Using the vector signaling system disclosed in Holden I, simple comparators would be assigned to the differences A-B, A-C, A-D, B-C, B-D and C-D. However, the example embodiment instead uses twelve multi-input comparators to determine the value of the differences A−1−B, A+1−B, A−1−C, A+1−C, A−1−D, A+1−D, B−1−C, B+1−C, B−1−D, B+1−D, C−1−D and C+1−D. Further, a code is employed whose values are more at the extremes of the range of values. One such code for a four wire system is (+,+,−,−), (+,−,+,−), (+,−,−,+), (−,+,+,−), (−,+,−,+), (−,−,+,+), with the twelve comparators above forming a discriminator for said code, wherein a "+" stands for the value +1, and a "−" stands for the value "−1".

Figure 3:
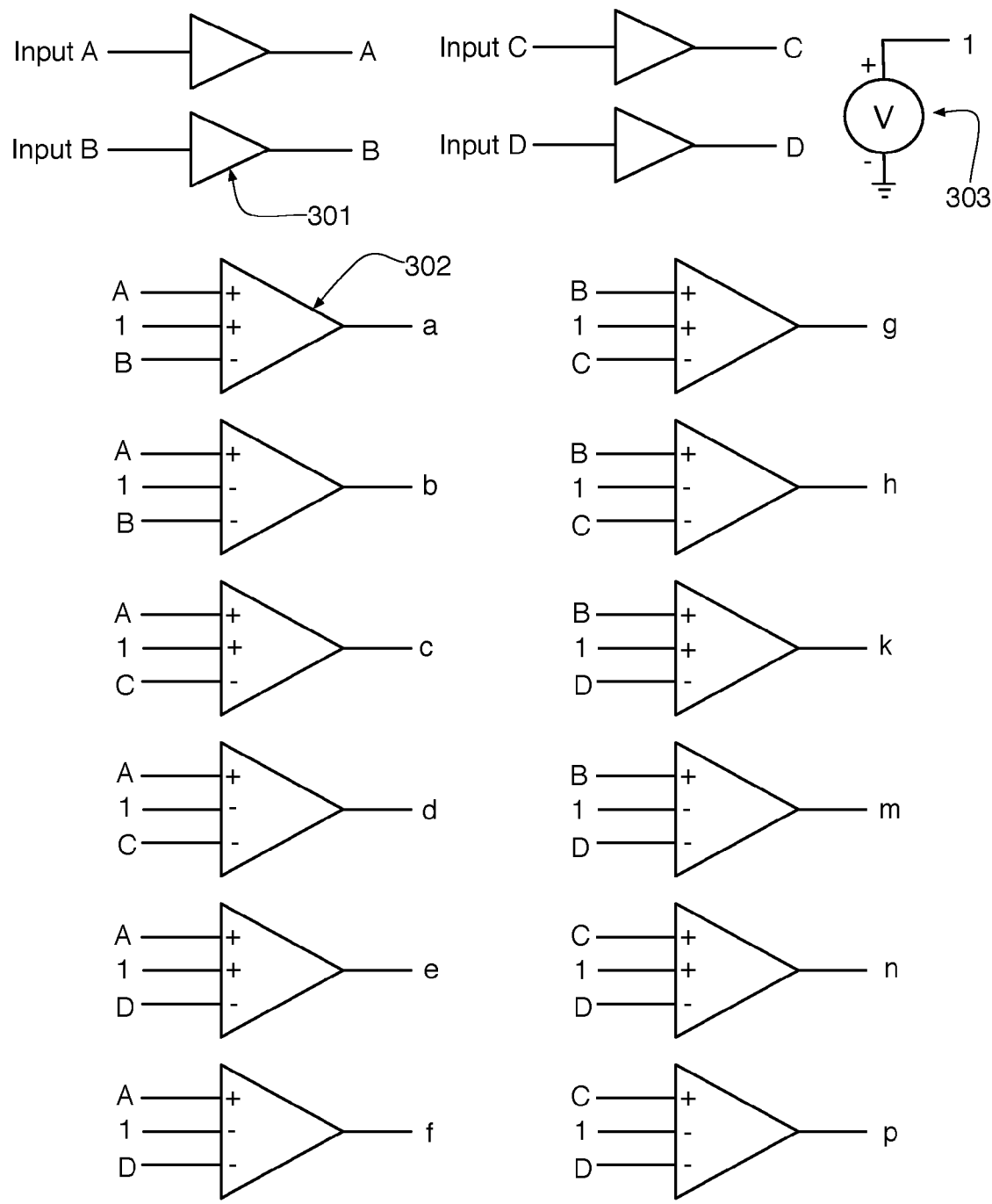
FIG. 3 shows a generalized on-level slicing receiver in accordance with at least one embodiment of the invention.

FIG. 3 is a schematic drawing of this discriminator, in accordance with at least one embodiment of the invention. Inputs A, B, C, and D are buffered as at 301 to produce internally distributed signals A, B, C, D as inputs to twelve multi-input comparators as exemplified at 302. A fixed offset input 1 is also shown as being provided by voltage source 303. Each comparator in FIG. 3 has three inputs of equal single-unit weight, with the sign of the input weight shown at each input terminal. The twelve comparators produce digital output results a, b, c, d, e, f, g, h, k, m, n, p that together identify each codeword of the vector signaling code.

Obtaining Offset Values Based on Divider of Maximum Swing

As was demonstrated in the previous example, reference voltages or input offsets may be used with both simple comparators and multi-input comparators to bias results away from ambiguous output states, and/or to facilitate detection of codeword attributes such as symbol sum. In accordance with at least one embodiment of the invention, examples of use include bias voltage 303 in FIG. 3, and slicer 713 level in FIG. 7. The optimum offset levels to be applied may be determined by use of a circuit that first determines the overall voltage excursions of the element being measured, and then uses a voltage divider to obtain intermediate reference levels relative to those maximum excursions. A circuit finds the maximum excursions, and stores their values. This storage may occur using an analog sample and hold circuit, a charge pump circuit that matches its voltage level to that of the extreme values on the inputs, or by storing a digital representation of the measured signal and recreating it using a digital-analog converter.

The previous example describes a code having a maximum extent ranging from +1 to −1 on any one wire, leading to a maximum difference between any pair of wires (that is, seen by any one comparator) ranging from +2 to −2, a span of 4 units. However, the actual received signal levels corresponding to said difference are likely to be attenuated by the channel, so in this example the actual maximum signal extent appearing at any one comparator under the existing conditions may be 400 mv. By using a four to one voltage divider, that actual value representing four units of span may be reduced to a voltage of 100 mv, which thus corresponds to one unit difference at the receiver in actual practice. This 100 mv voltage may then be added to or subtracted from the appropriate comparator input to provide the desired 1 unit offset.

Figure 4A:
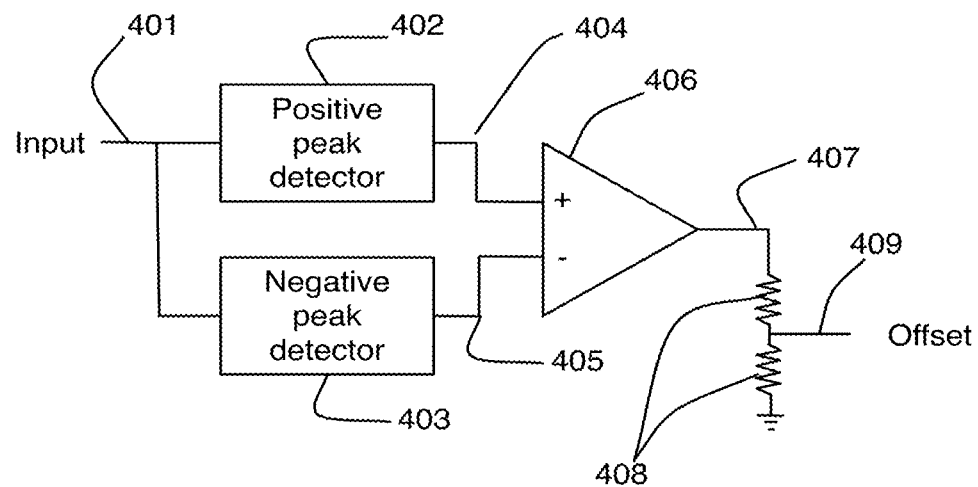
FIGS. 4A and 4B show two circuits for generation of an offset voltage in accordance with embodiments of the invention.

FIG. 4A illustrates this example, in accordance with at least one embodiment of the invention. Positive peak detector 402 and negative peak detector 403 determine the maximal excursions of input 401, with 404 representing the most positive signal level of input 401, and 405 representing the most negative signal level of input 401. The difference between 404 and 405 as calculated by differential amplifier 406 represents the maximum signal extent 407. A resistive divider 408 reduces the maximum signal extent 407, for example by the 4:1 ratio determined in the previous paragraph, producing offset voltage 409.

The result of this circuit is that the value at which the comparator output is indeterminate is shifted. Revising the earlier ternary signaling example to include this +1 offset: if the input difference not including the offset is +2, +1 or 0, the slicer output is 1. If the difference is −1, the slicer output is indeterminate. If the difference is −2, the slicer output is 0. In accordance with at least one embodiment of the invention, introduction of such offsets may be used to minimize indeterminate comparator results, increase noise immunity, and/or improve codeword detection.

Obtaining Offset Based on Value Representing Known Previous Symbol

Figure 4B:
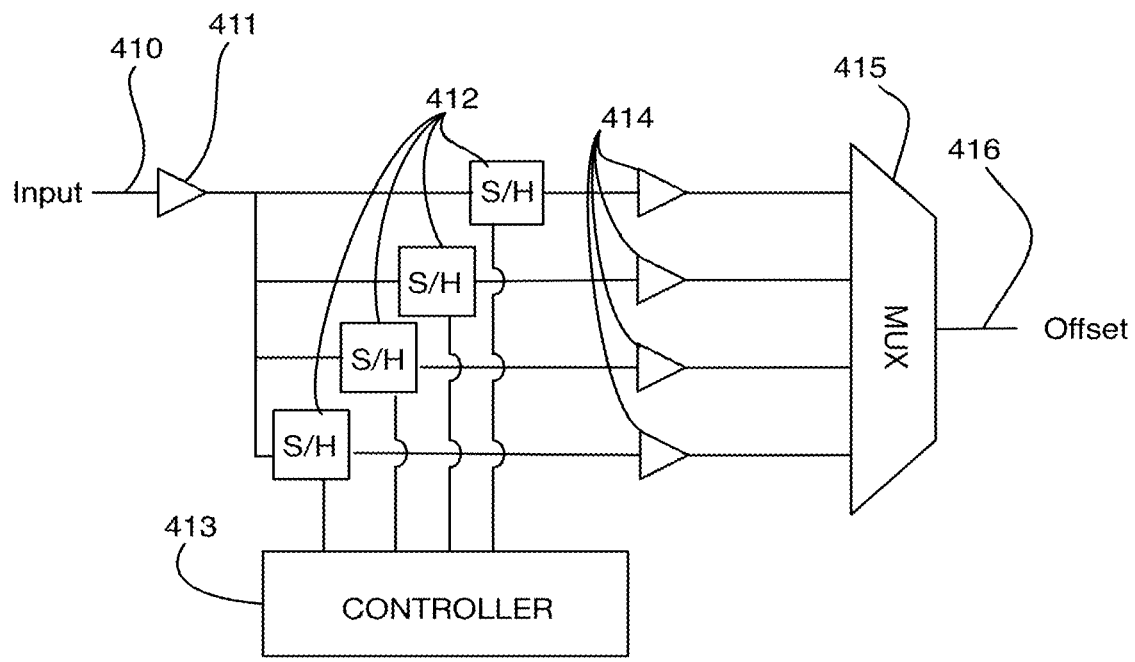

In accordance with at least one embodiment of the invention, the most recent sample that has been subsequently determined by the decoder to be of the desired symbol value is used as the offset. This type of circuit is known as a decision feedback circuit. As shown in FIG. 4B, input 410 is stored using, as an example, one of sample and hold circuits 412 for a period long enough to determine what symbol is represented. An analog multiplexer as shown at 415, or a crossbar switch as in the Holden II disclosure is then used to select a stored value for use as an offset 416. Controller 413 may be used to manage sample and hold operations at 412, and optional buffers 411 and 414 may be incorporated to avoid loading-related disturbances of the sampled signals. As will be apparent to one of skill in the art, other analog storage elements including flash or EEPROM cells; the combination of a A/D converter, memory, and D/A converter; or the combination of a charge pump plus a comparator may be used instead of the example sample and hold circuits.

Generalized Pseudo-Differential Vector Signaling

Generalized pseudo-differential vector signaling increases the alphabet size of the code using additional symbols, and may add additional wires to the transmission lines on which this extended symbol alphabet is transmitted, or use some of the existing transmission lines to transmit information needed for the detection circuitry, while using the other transmission lines for sending data. In accordance with at least one embodiment of the invention, these wires are grouped into pairs and correlated signals are transmitted across these pairs. This signaling system may offer tradeoffs between noise tolerance, skew tolerance, and total throughput.

In accordance with at least one embodiment of the invention a ternary alphabet is used for transmission over 4 transmission lines. The elements of the alphabet may be identified as −1, 0, or 1. A further embodiment adds two additional elements to the alphabet, which may for example be the elements ½ and −½ and, optionally, two additional wires to the transmission line which carry at every clock cycle either the values (½, −½), or (−½, ½). The other 4 wires may carry any ternary values, or elements from a ternary code designed to combat noise on the wires.

Figure 5:
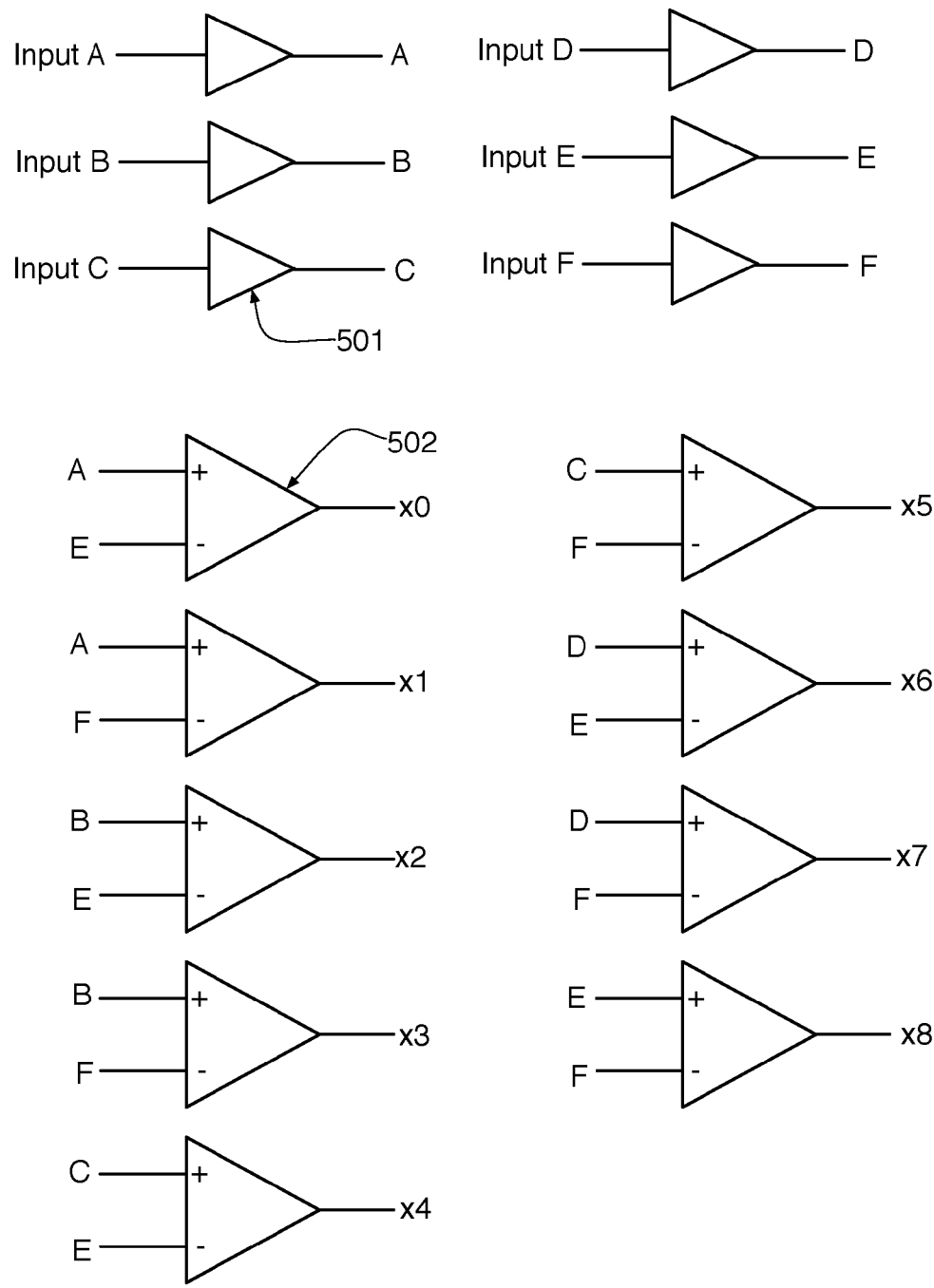
FIG. 5 shows a generalized pseudo-differential receiver, in accordance with at least one embodiment of the invention.

FIG. 5 provides an illustrated example in accordance with at least one embodiment of the invention. For a given clock cycle, the receiver may receive 6 values (Inputs A, B, C, D, E, F) on the six transmission wires, wherein the last two values may correspond to the two additional wires carrying the values ½ or −½. Thus, we either have E=½, F=−½, or E=−½, F=½. The input values are buffered 501 for distribution to the nine comparators 502 which compare the buffered input values: A with E, A, with F, B with E, B with F, C with E, C with F, D with E, D with F, and E with F, producing comparison results x0, x1, x2, x3, x4, x5, x6, x7, x8 and x9 respectively.

Since in every case the compared values are distinct, (that is, in no case are the expected values being compared identical,) the comparators will unambiguously yield either a value of +1, meaning that the first input to the comparator is bigger than the second input, or a value of −1 meaning that the first input to the comparator is smaller than the second input. Given those comparator outputs, the actual values of the transmitted codeword represented by A, B, C, D, E, F may be obtained in the following way:

$A=(x0+x1)/2$ $B=(x2+x3)/2$ $C=(x4+x5)/2$ $D=(x6+x7)/2$ $E=x8/2$ $F=-x8/2$

It should be noted that these results for A, B, C, D represent absolute ternary values (i.e. +1, 0, or −1) even though the comparators used to obtain the results are binary and operate differentially, that is, between inputs rather than from one input to a fixed reference such as ground.

If the original vector signaling (or other type of ternary) code on the first four wires is capable of transmitting b bits, then the new code is capable of transmitting b+1 bits, wherein the additional bit is given by x8.

Vector Signaling Utilizing Temporal Signaling

In accordance with at least one embodiment of the invention, the elements of the vector signaling code are sent over one or more wires at different times. For example, a vector consisting of four symbols can be sent in one clock cycle over four wires, in two clock cycles over two wires, or in four clock cycles over a single wire. Similarly, a vector of eight symbols can be sent over eight wires on one clock cycle, four wires on two clock cycles, two wires on four clock cycles, or one wire on eight clock cycles. When the vector is sent over more than one clock cycle, the receiver must have a means of determining which vector element or elements are represented within each received clock cycle. That is, this method of signaling requires that the vector codes be recovered with the aid of a form of framing of the codes on the wires. Two general types of framing are compatible with this method: boot-time training, and continuous statistical framing.

Boot-time training is a well-known method of aligning a receiver by sending a known pattern at link initialization or boot-time to synchronize framing at the transmitter and receiver. This method is common in computer-system links, such as the boot-time training used by the PCI Express specification to align the skew of the lanes that make up a PCI Express link.

Statistical framing is another well-known method of synchronizing transmitter and receiver framing. This method organizes the stream of codewords comprising the communication so as to have a unique reserved sequence or statistically repeating signature that can be found by a statistical framer. The reserved sequence technique uses a designated codeword or other transmission sequence that is periodically introduced into the transmitted data stream and has an unambiguous framing interpretation. Ambiguity may be eliminated by reserving that pattern exclusively for this use, or by disallowing competing patterns from being used. The repeating signature technique of statistical framing utilizes a characteristic of a properly-framed data stream such as maintenance of correct error-detection or error-correction sequence, which would be statistically unlikely to appear in an improperly framed sequence.

Statistical framing methods are commonly used in telecommunication links because of the robustness of said technique to line impairments including impairments in which the receiver erroneously receives too many or too few bits. Both the SONET/SDH telecommunications and 10 Gigabit Ethernet families of specifications employ this sort of framing. This well-known method is robust because the receiver is always checking as to whether it sees the pattern in the incoming link. If the receiver does not see the pattern, said receiver drops into a mode where said receiver hunts for a regular reoccurrence of the pattern.

Example of Vector Signaling Utilizing Temporal Signaling

In accordance with at least one embodiment of the invention four symbols are sent in two clock times over 2 wires.

The vector signaling code used in this example is the union of the permutation modulation codes generated by the vectors (1,0,0,−1) and (1,1,−1,−1). The code thus consists of 18 codewords, of which 12 are permutations of the vector (1,0,0,−1) and six are permutations of the vector (1,1,−1,−1). In the following, the symbol "+" is used for the value +1 and the symbol "−" for the value −1.

Sixteen of the 18 available codewords are used to encode four bits of user data. To illustrate use of the statistical framing technique with this example, the codeword (+,+,−,−) is used as one of the 16 data-encoding codewords and as the framing identifier, and the codeword (−, +, +) is reserved from use to insure the framing identifier is unique. The remaining codeword or codewords may be assigned to auxiliary functions. One embodiment in accordance with the invention assigns a reserved codeword as an alternative to one of the sixteen codewords used for data encoding; as examples, transmission of the alternative code instead of the normal code may then represent transmission of one bit of data in a secondary serial communications channel, may introduce a desirable signal transition on a run-length-limited wire, or may introduce a desirable transition of the common mode voltage of the wire pair.

Figure 6:
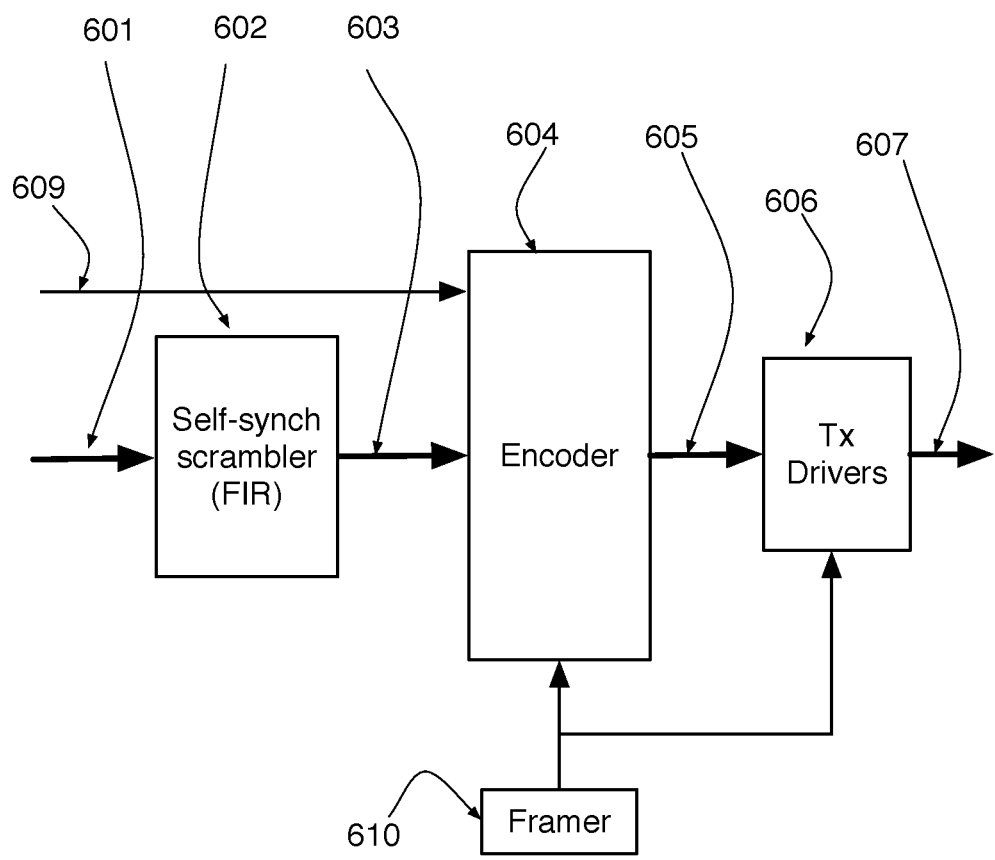
FIG. 6 is a block diagram for a temporal signaling transmitter, in accordance with at least one embodiment of the invention.

An illustration of the transmitting operation in accordance with at least one embodiment of the invention is shown in FIG. 6. Input data 601 is scrambled prior to encoding using a well-known scrambling method such as a self-synchronizing scrambler 602. The four scrambled data bits 603 are encoded 604 as a codeword 605 of four ternary values, which are then output by transmit drivers 606 two values at a time on two wires 607, for two consecutive clock times as regulated by framer 610. Encoder 604 may optionally also encode auxiliary input 609.

Figure 7:
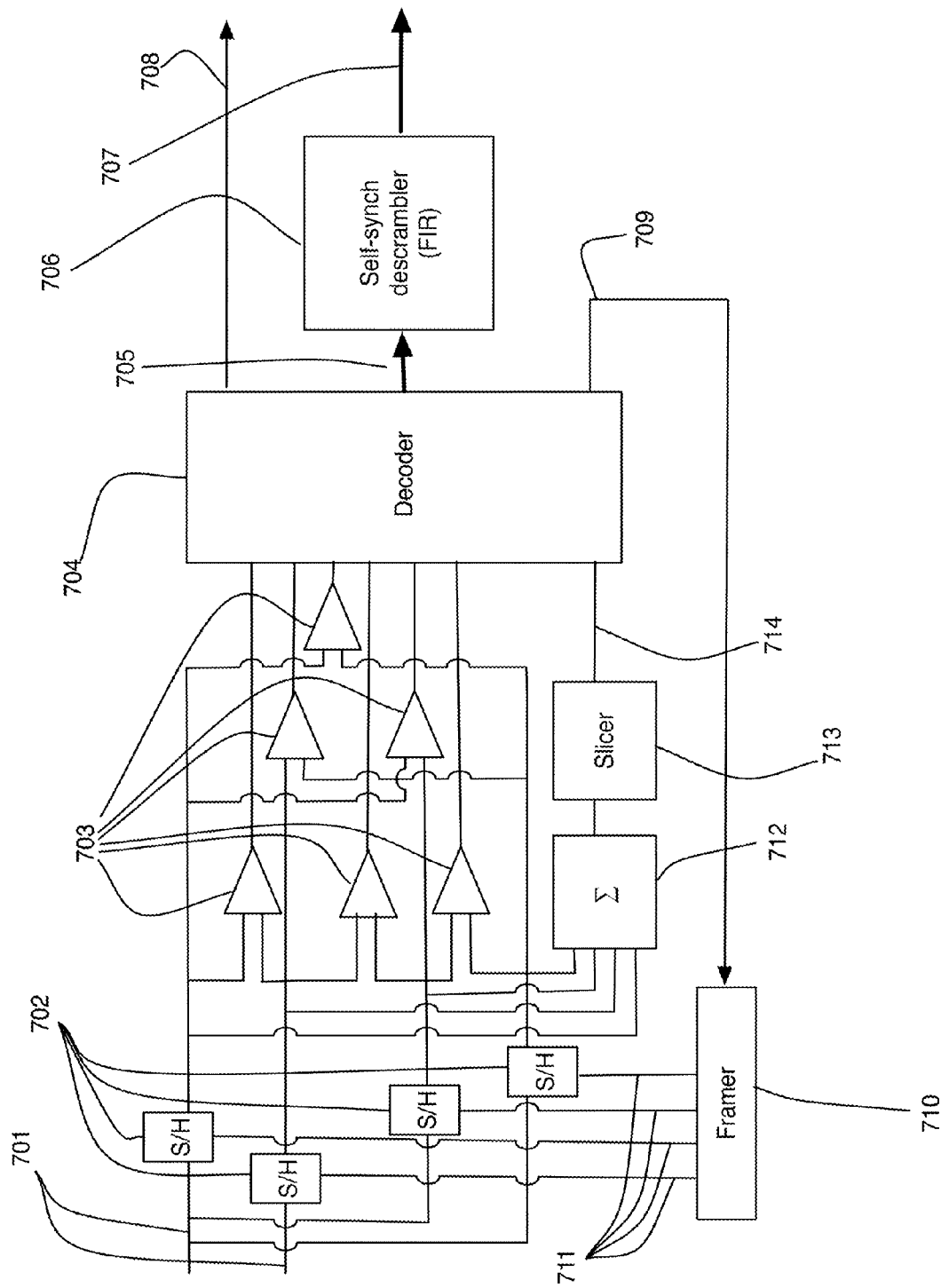
FIG. 7 is a block diagram of a temporal signaling receiver also incorporating SubUIDS alignment of input signals to a common clock, in accordance with at least one embodiment of the invention.

An illustration of a receiving operation in accordance with at least one embodiment of the invention is shown in FIG. 7. Analog sample-and-hold circuits 702 or functionally equivalent elements are used to gather four analog values from the two input wires 701 in two consecutive clock times as identified 711 by the framer 710. These four gathered analog values are input into a six comparator circuit 703 structured to obtain all pairwise comparisons of the four values. The four gathered analog values are further input to a circuit 712 that computes an aggregate vector sum, as one example, based on the sum of the absolute values of the analog differences, and compares 713 that sum to a reference value either fixed at a "center of eye" level, or adjusted to be at such level based on analysis of past signal behavior. Other embodiments may utilize different computations of aggregate vector sum 713 and/or different comparisons 713, as disclosed in FIG. 8 of Holden I.

The six pairwise comparison results from comparators 703 and the one sum comparison result 714 are input to a decoder 704, which recovers four bits of data 705 from the seven inputs, and optionally may also produce auxiliary output 708. The four bits of data are then descrambled 705 using the same method as was applied at the transmitter to produce four bits of output data 707.

If the statistical framing technique is used, a telecom-style statistical framer circuit 710 is used to monitor identification of the +,+ to −,− transition on both lines that represents the correct framing of the unique codeword+,+,−,− which is sent as +,+ during the first clock time and −,− during the second clock time. This pattern may be further identified by the codeword decoder, which may issue a specific output 709 to the framer when that codeword is identified. The scrambler circuit employed on the input data ensures that the pattern will happen regularly, statistically occurring on average approximately every 32 clock times. While the design of framer circuits in general is well known, use of a framer circuit to detect a particular pattern simultaneously occurring on two lines may be novel.

If the boot-time framer technique is used, the transmitter must emit a known vector or sequence of values on the wires when the link is first enabled, to permit the framer 710 to determine which set of samples is the first and which is the second. The decoder may similarly identify this indication 709, or it may be identified by a circuit within the framer 710 itself. Once so identified, the correct sample sequence is thereafter maintained by the framer's counting of clock times.

The example embodiment may have up to two Simultaneous Switched Output signals within a single symbol time frame, but collectively has a SSO of 0 over a two clock time interval. Signals generated by this embodiment may be passed through AC coupling capacitors. As this signaling method introduces imbalance between the two wires, the electromagnetic interference emitted using this method may be higher than that of a pure differential circuit, so shielding or ground-plane techniques may be required for the signal path.

The encoder and decoder circuits for the described four symbol vector embodiment in accordance with the invention preferably uses two clocks to transmit one vector, but other implementations are possible. Similarly, an eight symbol vector embodiment in accordance with the invention preferably uses four clocks to transmit one vector, but other implementations are possible.

The described embodiment utilizing a four symbol vector transmitted over two wires in two clock intervals can realize PAM-4 throughput with nearly PAM-3 signal-to-noise ratio, in a reasonably sized pair-oriented design that has good SSO properties and only moderate common mode rejection impairment. The throughput gain can be even larger when longer vector signaling codes are employed.

Skew Tolerance

In traditional differential circuits, the wires in the system are provisioned in pairs with tight intra-pair skew requirements and loose inter-pair skew requirements. Most modern standards for systems are written with this set of requirements for at least some high speed circuits in the system, including PCIe and Backplane Ethernet.

Vector signaling circuits rely on the property of the wires of a system being provisioned as a set with minimal intra-ensemble skew. That is, the entire collection of wires is treated as a set. For optimal performance, skew must be compensated for across such a set of wires in a vector-signaling circuit. Vector signaling circuits that have had their skew compensated for will not perform with as good common-mode noise rejection as those which natively have low skew, but they will perform with the same Gaussian noise properties as a natively low skew circuit. Said compensated circuits will also produce somewhat more electromagnetic interference than ensembles that are wired with no skew.

Receiver-Side Sub Unit Interval Analog Skew Tolerance Circuit

Various circuits and methods exist in prior art which compensate for skew on the wires as long as the skew is less than one Unit Interval (UI). One example is provided by [Buchwald1], which teaches selection among multiple reference clocks having different predetermined phases, allowing receiver sampling to occur with different reference phases on each wire, thereby compensating a skew of up to 1 UI among the wires. Said methods are referred to in this disclosure as Sub-UI De-Skew (SubUIDS).

In accordance with at least one embodiment of the invention, a SubUIDS circuit corrects inter-wire skew of up to one symbol period or UI by re-aligning the analog signals of each wire using, as an example, sample-and-hold circuits 702 in the receive signal path of each channel as shown in FIG. 7. Each channel 701 is sampled at an appropriate time 711 relative to its own propagation delay, with the held values then simultaneously analyzed by the symbol decoding system 703.

Receiver-Side Skew Tolerance Circuit Utilizing Multi-Input Comparators

In accordance with at least one embodiment of the invention, a skew tolerant vector signaling system may require the skew amount to be known only at the receiver. This technique assumes that a SubUIDS circuit has been employed in the receiver to align the receiver input data to the clock used by the subsequent circuit.

For each pair of wires an associated code is chosen, wherein a code is a subset of $S^2$ and S is a finite alphabet. If there are p pairs of wires available and the corresponding codes are denoted by $C_0, \ldots, C_{p-1}$, then the transmission code on the 2p wires of which the transmission lines is comprised is given by the set of all vectors of the form $(x_0, x_1, x_2, x_3, \ldots, x_{2(p-1)}, x_{2p-1})$ wherein $(x_0, x_1)$ is an element of $C_0$, $(x_2, x_3)$ is an element of $C_1, \ldots$, and $(x_{2(p-1)}, x_{2p-1})$ is an element of $C_{p-1}$. The number of elements in this transmission code is therefore the product of the number of elements in $C_0, \ldots, C_{p-1}$. This code is skew-tolerant since every word received is a valid codeword, no matter what the skew on the wires is.

The detection and decoding of the skew can be done in a variety of ways. A preferred embodiment uses multi-input comparators, as described previously.

In a first example, the number p of pairs of wires is 2 to transmit 3 bits of data, the code $C_0$ is the code $\{(-1,-1),(-1,1),(1,-1),(1,1)\}$ and the code $C_1$ is the differential code $\{(1,-1),(-1,1)\}$.

The codewords of this transmission code are given below, with the indices A, B, C, and D used to name the 4 wires.

| A | B | C | D |
|---|---|---|---|
| −1 | −1 | −1 | 1 |
| −1 | −1 | 1 | −1 |
| −1 | 1 | −1 | 1 |
| −1 | 1 | 1 | −1 |
| 1 | −1 | −1 | 1 |
| 1 | −1 | 1 | −1 |
| 1 | 1 | −1 | 1 |
| 1 | 1 | 1 | −1 |

Figure 8:
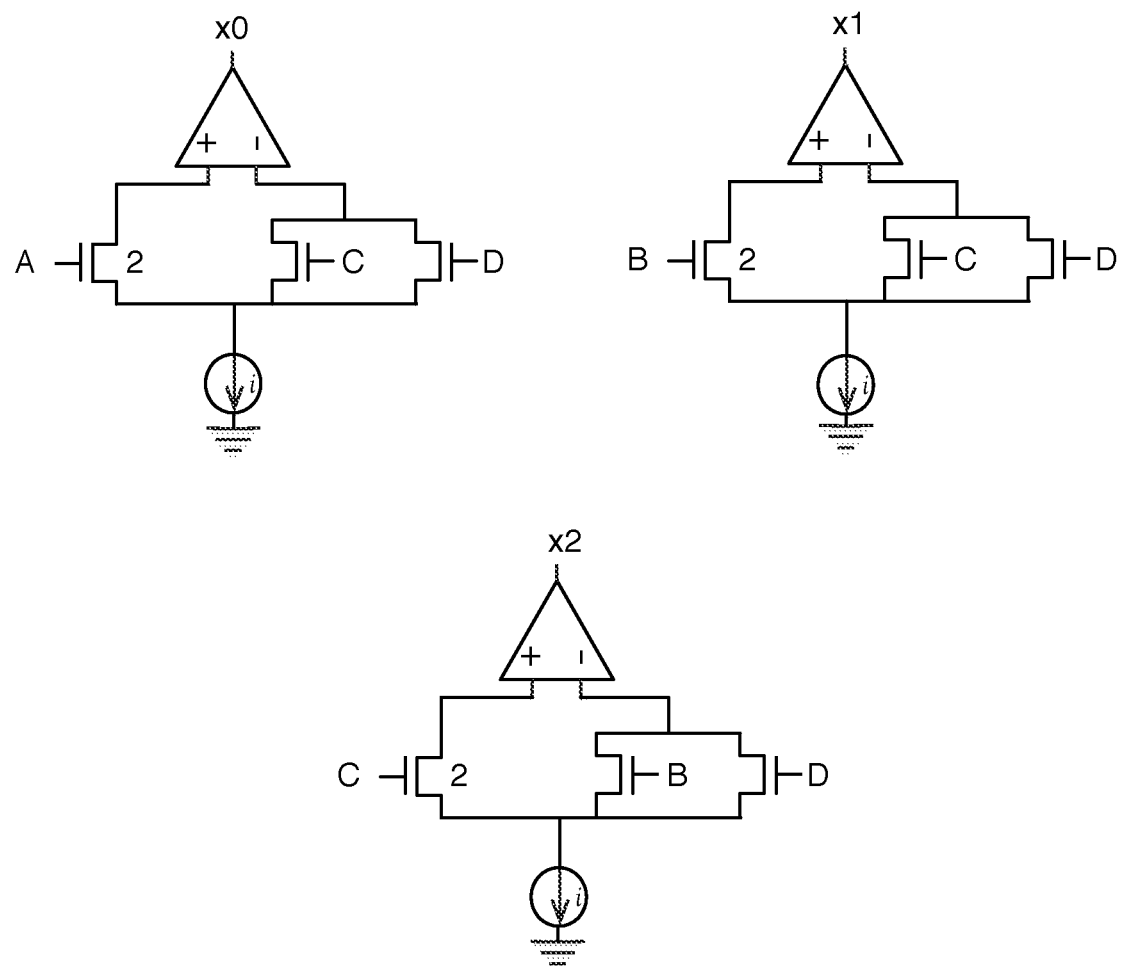
FIG. 8, FIG. 9, and FIG. 10 illustrate the comparator input weights used in three examples of receive-side skew compensation using multi-input comparators, in accordance with at least one embodiment of the invention.

This code is binary. An encoding process for this code is as follows: given three bits (b0, b1, b2), the values on the wires A, B, C, D are given as $(-1)^{b0}, (-1)^{b1}, -(-1)^{b2}, (-1)^{b2}$. One embodiment of multi-input comparators to detect this code is:

x0=sign(2*A−(C+D))
x1=sign(2*B−(C+D))
x2=sign(2*C−(B+D))

which are also shown schematically as multi-input comparators in simplified notation in FIG. 8. It is easily seen that if there is no noise on the wires, then the values of these comparisons are $(-1)^{b0}, (-1)^{b1}$, and $(-1)^{b2}$, which reveal the bits b0, b1, b2.

The minimum sensitivity of this set of comparators is $(2/\sqrt{6})$. This leads to a coding scheme that is about 5 dB better than a PAM-4 transmission, or 4.5 dB worse than differential signaling. The pin-efficiency of this scheme is ¾, which is much better than the pin-efficiency of differential signaling.

A further embodiment in accordance with the invention based on a transmission system of more than 2 pairs of wires incorporates a variation of the previous method to increase pin-efficiency. If there are p pairs available, then the vector signaling codes $C_0, \ldots, C_{p-2}$ can be chosen to equal to $\{(-1,-1),(-1,1),(1,-1),(1,1)\}$ whereas the vector signaling code $C_{p-1}$ can be chosen to be $\{(1,-1),(-1,1)\}$. Very similar detection schemes as the above can be used for this code, leading to a skew-tolerant code with pin-efficiency 2*(p−1)/2p, and a noise immunity that is 5 dB better than that of a PAM-4 transmission, without suffering from reference generation noise as PAM-4 does.

In accordance with at least one embodiment of the invention, a slightly higher pin-efficiency is obtained using a code on 4 wires in which $C_0=\{(-1,1),(1,-1),(0,0)\}$ and $C_1=\{(-1,1),(1,-1),(-1,-1),(1,1)\}$. The codewords of this transmission code are given below, with the indices A, B, C, and D used to name the 4 wires.

| A | B | C | D |
|---|---|---|---|
| −1 | 1 | −1 | −1 |
| −1 | 1 | −1 | 1 |
| −1 | 1 | 1 | −1 |
| −1 | 1 | 1 | 1 |
| 1 | −1 | −1 | −1 |
| 1 | −1 | −1 | 1 |
| 1 | −1 | 1 | −1 |
| 1 | −1 | 1 | 1 |
| 0 | 0 | −1 | −1 |
| 0 | 0 | −1 | 1 |
| 0 | 0 | 1 | −1 |
| 0 | 0 | 1 | 1 |

Figure 9:
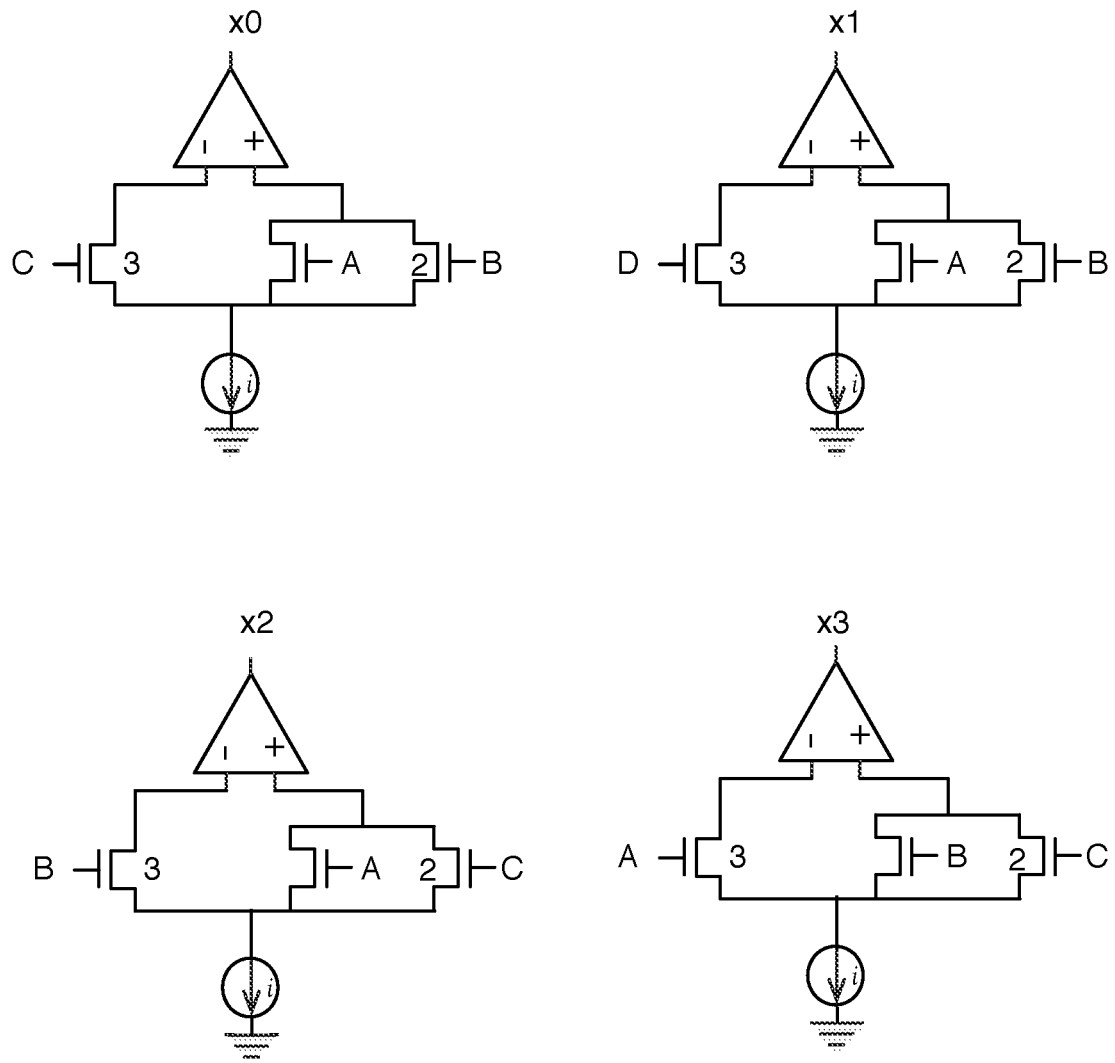

A detector for this code is comprised of the four multi-input comparators:

x0=sign(A+2*B−3*C)
x1=sign(A+2*B−3*D)
x2=sign(A+2*C−3*B)
x3=sign(B+2*C−3*A)

which are also shown schematically as multi-input comparators in simplified notation in FIG. 9. The components of the codewords may be obtained from these multi-input comparator outputs as (x2−x3)/2, (x3−x2)/2, −x0, −x1. The pin-efficiency of this scheme can be made to approach $\log_2(12)/4$ which is roughly 0.896. The minimum sensitivity of this set of comparators is $(1/\sqrt{6})$ which is about 1.3 dB better than a PAM-4 transmission.

A further embodiment of the invention for a transmission system of more than 2 pairs of wires provides an additional increase of pin-efficiency. If there are p pairs available, then the vector signaling codes $C_0, \ldots, C_{p-2}$ can be chosen to equal to $\{(-1,-1),(-1,1),(1,-1),(1,1)\}$ whereas the vector signaling code $C_{p-1}$ can be chosen to be $\{(1,-1),(-1,1)\}$. Very similar detection schemes as the above can be used for this code, leading to a skew-tolerant code with pin-efficiency 2*(p−1)/2p, and a noise immunity that is 1.3 dB better than that of a PAM-4 transmission, and does not suffer from reference generation noise as PAM-4 does.

In accordance with at least one embodiment of the invention a four wire transmission system uses the codes $C_0=\{(-1,1),(1,-1)\}$ and $C_1=\{(-1,-1),(-1,0),(-1,1),(0,-1),(0,1),(1,-1),(1,0),(1,1)\}$ to obtain a pin-efficiency of one or larger. Using the indices A, B, C, D to name the four wires, the codewords of this transmission code are given below.

| A | B | C | D |
|---|---|---|---|
| −1 | −1 | −1 | 1 |
| −1 | −1 | 1 | −1 |
| −1 | 0 | −1 | 1 |
| −1 | 0 | 1 | −1 |
| −1 | 1 | −1 | 1 |
| −1 | 1 | 1 | −1 |
| 0 | −1 | −1 | 1 |
| 0 | −1 | 1 | −1 |
| 0 | 1 | −1 | 1 |
| 0 | 1 | 1 | −1 |
| 1 | −1 | −1 | 1 |
| 1 | −1 | 1 | −1 |
| 1 | 0 | −1 | 1 |
| 1 | 0 | 1 | −1 |
| 1 | 1 | −1 | 1 |
| 1 | 1 | 1 | −1 |

Figure 10:
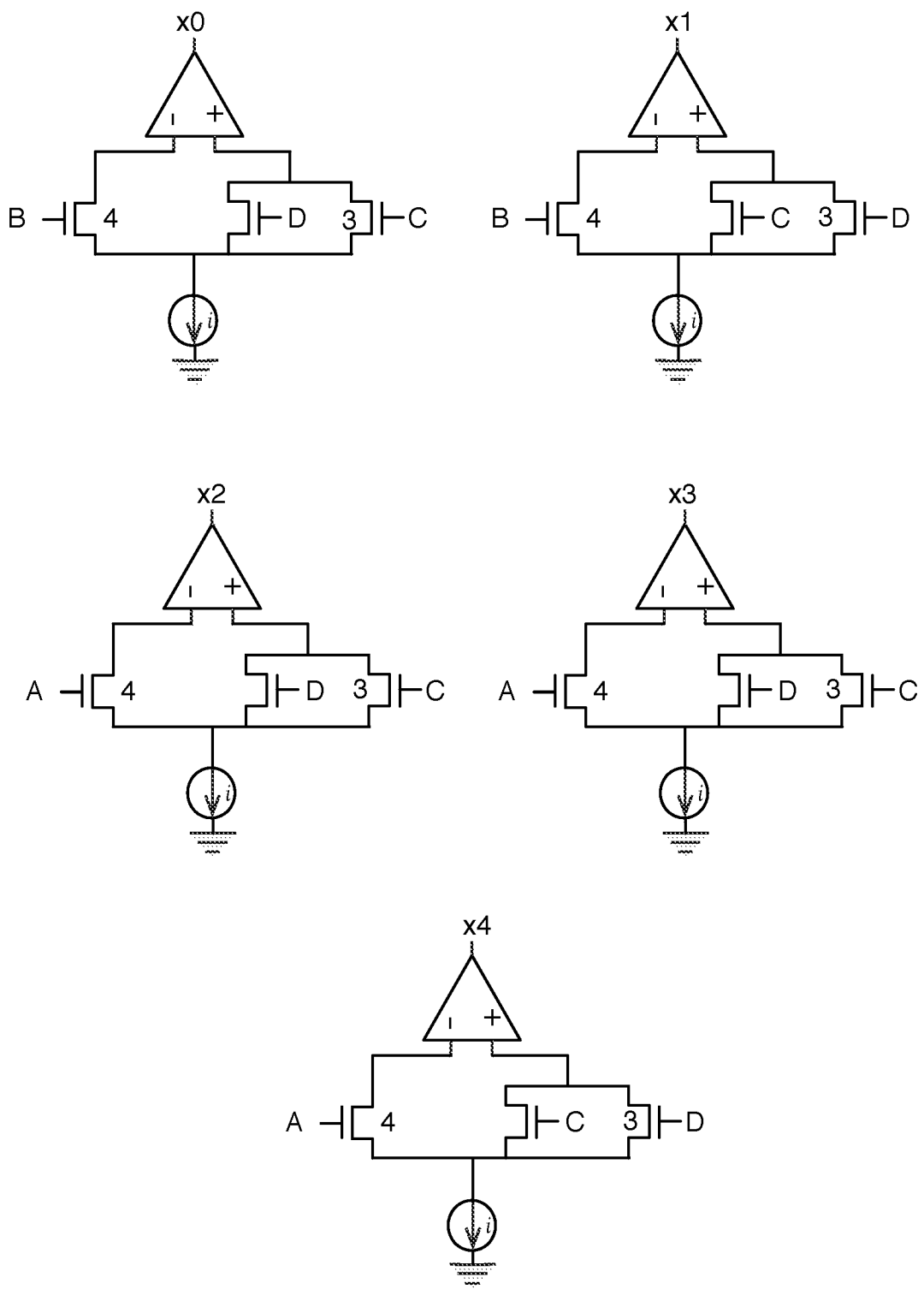

A detector for this code is comprised of the five multi-input comparators:

$x0 = \text{sign}(3*C+D-4*B)$
$x1 = \text{sign}(3*D+C-4*B)$
$x2 = \text{sign}(3*C+D-4*A)$
$x3 = \text{sign}(3*D+C-4*A)$
$x4 = \text{sign}(A+3*D-4*C)$ which are also shown schematically as multi-input comparators in simplified notation in FIG. 10. The components of the codewords are obtained as $-(x2+x3)/2$, $-(x0+x1)/2$, $-x4$, $x4$. The pin-efficiency of this scheme is 1. The minimum sensitivity of this set of comparators is $(2/\sqrt{14})$ which is about 1.3 dB worse than a PAM-4 transmission.

A further embodiment of the invention may be applied to transmission systems having more than two pairs of wires. If there are p pairs available, then the vector signaling codes $C_1, \ldots, C_{p-1}$ can be chosen to equal $\{(-1,-1),(-1,0), (-1,1), (0,-1), (0,1), (1,-1),(1,0),(1,1)\}$ whereas the vector signaling code $C_0$ can be chosen to be $\{(1,-1),(-1,1)\}$. Very similar detection schemes as the above can be used for this code, leading to a skew-tolerant code with pin-efficiency $1.5-1/p$, and a noise immunity that is 1.3 dB worse than that of a PAM-4 transmission, without suffering from reference generation noise as PAM-4 does. The pin-efficiency of this scheme is significantly higher than that of PAM-4, whereas its thermal noise immunity is only slightly worse.

Skew Compensation Utilizing Generalized Pseudo-Differential Signaling

Generalized pseudo-differential signaling, as described earlier in this disclosure, can be used to counter skew on the transmission wires. Referring to the example given above, detection of the signals is based on comparison with the differential pair (e,f) comprising the last two wires only, and this comparison uniquely determines the values on the wires. Once these values are known, they may be stored, and later retrieved by a skew compensation unit that knows the amount of skew on every wire relative to the (e,f) differential pair. The values thus obtained may then be provided to a decoder to retrieve the bits.

This technique is preferentially used with a SubUIDS circuit in the receiver to align the receiver input data to the clock used by the subsequent circuits.

Figure 11:
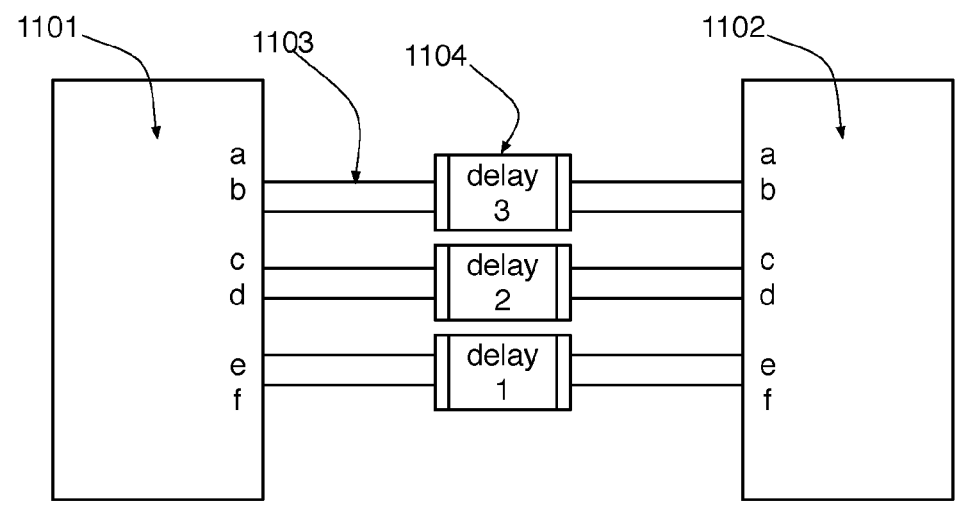
FIG. 11 is a block diagram of receive skew compensation using generalized pseudo-differential signaling in accordance with at least one embodiment of the invention.
Figure 11:
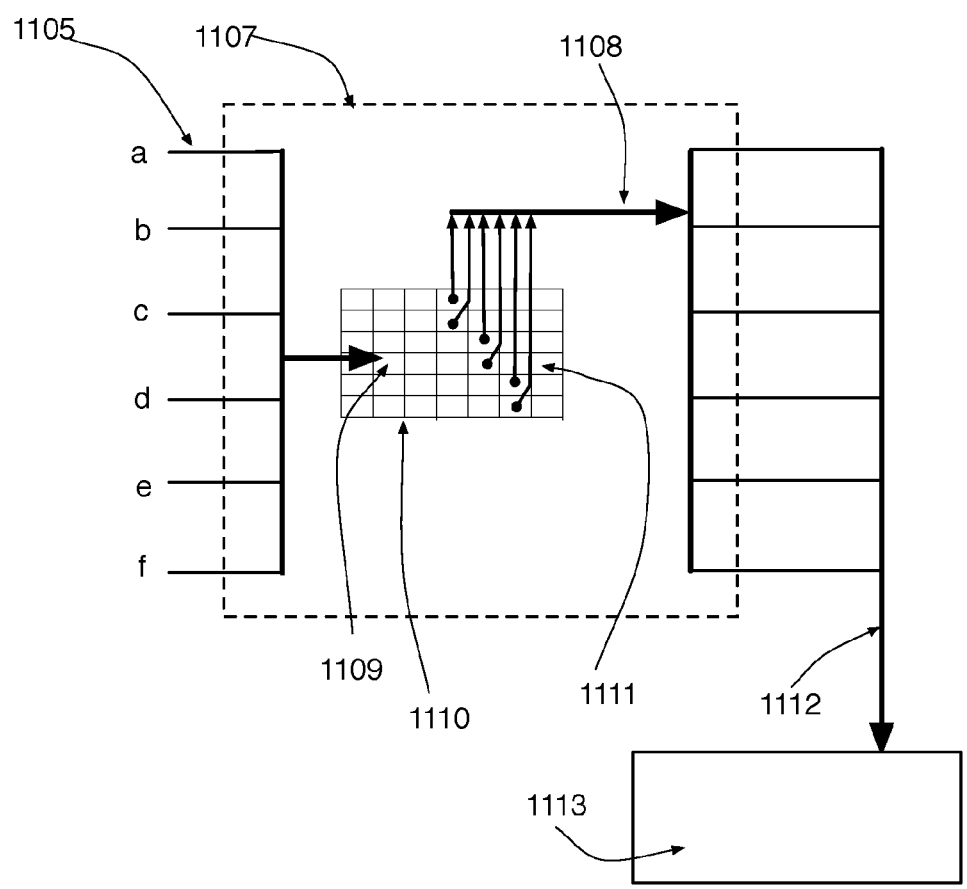

In accordance with at least one embodiment of the invention, it is assumed as an example that the end-to-end propagation delay of the 4 wires in units of symbol intervals is 3, 3, 2, 2 respectively, and the end-to-end propagation delay of the additional two wires is 1. This is illustrated in FIG. 11 where transmitter 1101 and receiver 1102 are connected by wire pairs 1103 labeled a, b, c, d, e, f. The physical transmission delay on those wires is represented graphically by delay elements 1104, which as examples show a propagation delay skew of 3 symbol intervals over wires a and b, a propagation delay of 2 symbol intervals over wires c and d, and a propagation delay of 1 symbol intervals over wires e and f Thus, if the received signal timing of wires e and f are taken as a reference, the receiver will see a skew (i.e. additional propagation delay beyond that of the reference) of 2 symbol intervals for data on wires a and b, and a skew of 1 symbol interval for data on wires c and d. Physically, such variations may be caused by differences in routed wire length or variations in transmission line geometry or composition.

Because of these discrepancies in propagation time, at any time instance t the receiver receives on wires a and b the symbols transmitted at time instance t−3, on wires c and d the symbols transmitted at time t−2, and on wires e and f the symbols transmitted at time instance t−1. For the purposes of this description, we may suppose that the encoder is using a union of the PM codes generated by (+1,0,0,−1), augmented by the four vectors (+1,−1,+1,−1), (+1,−1,−1,+1), (−1,+1,+1,−1), (−1,+1,−1,+1), leading to transmission of four bits on four wires. Suppose that the following sequence of 5 bit vectors is to be transmitted over 7 clock cycles over the four original and 2 additional transmission wires:

| Time t+6 | Time t+5 | Time t+4 | Time t+3 | Time t+2 | Time t+1 | Time t |
|---|---|---|---|---|---|---|
| 1 | 0 | 0 | 1 | 1 | 0 | 1 |
| 0 | 1 | 0 | 1 | 0 | 0 | 0 |
| 0 | 0 | 0 | 0 | 1 | 0 | 1 |
| 1 | 1 | 0 | 0 | 1 | 1 | 0 |
| 0 | 1 | 1 | 1 | 0 | 1 | 0 |

The sequence of values transmitted on the 6 wires over the 7 clock cycles may then be:

| Wire | Time t+6 | Time t+5 | Time t+4 | Time t+3 | Time t+2 | Time t+1 | Time t |
|---|---|---|---|---|---|---|---|
| a | 0 | 0 | 1 | 1 | 0 | 1 | 0 |
| b | 0 | 1 | −1 | −1 | 0 | 0 | −1 |
| c | 1 | 0 | 0 | 1 | −1 | −1 | 0 |
| d | −1 | −1 | 0 | −1 | 1 | 0 | 1 |
| e | ½ | −½ | −½ | −½ | ½ | −½ | ½ |
| f | −½ | ½ | ½ | ½ | −½ | ½ | −½ |

Because of the skew, the values received on wires a, b, c, d, e at the various time instances follow the pattern:

| Wire | Time t+6 | Time t+5 | Time t+4 | Time t+3 | Time t+2 | Time t+1 | Time t |
|---|---|---|---|---|---|---|---|
| a | t+3 | t+2 | t+1 | t | t−1 | t−2 | t−3 |
| b | t+3 | t+2 | t+1 | t | t−1 | t−2 | t−3 |
| c | t+4 | t+3 | t+2 | t+1 | t | t−1 | t−2 |
| d | t+4 | t+3 | t+2 | t+1 | t | t−1 | t−2 |
| e | t+5 | t+4 | t+3 | t+2 | t+1 | t | t−1 |
| f | t+5 | t+4 | t+3 | t+2 | t+1 | t | t−1 | with the entries in this matrix corresponding to the time instance the corresponding value was sent on the corresponding wire. For example, the value "t" in row "d" of column "Time t+2" means that the value received on wire d at time instance t+2 is the value that was sent on that wire at time instance t.

Based on this, the received values on the wires at the various clock cycles will be:

| Wire | Time t + 6 | Time t + 5 | Time t + 4 | Time t + 3 | Time t + 2 | Time t + 1 | Time t |
|---|---|---|---|---|---|---|---|
| a | 1 | 0 | 1 | 0 | x | x | X |
| b | −1 | 0 | 0 | −1 | x | x | X |
| c | 0 | 1 | −1 | −1 | 0 | x | X |
| d | 0 | −1 | 1 | 0 | 1 | x | X |
| e | −½ | −½ | −½ | ½ | −½ | ½ | X |
| f | ½ | ½ | ½ | −½ | ½ | −½ | X |

Herein, an "x" means that the corresponding value is outside the time window considered in this example.

The values on the wires are determined using the previously described generalized pseudo-differential vector signaling receive processing. These values may be stored, and then recombined using the knowledge of the skew amounts on the wires obtained by the receiver to obtain f. For example, at time t+6 the receiver may determine the values transmitted at time t+3 on the wires as (1,−1,1,−1,−½, ½). This can then be decoded to the bit values (1,1,0,1,1).

This receive skew compensation process in accordance with at least one embodiment of the invention is illustrated in FIG. 11, where symbol values 1105 are stored in storage medium 1110 in locations 1109 corresponding to receipt at a single interval of time. They are subsequently reacquired from locations 1111 in storage medium 1110 corresponding to different receipt times but a single transmission interval of time, to produce de-skewed values 1112 which are provided to decoder 1113. It will be obvious to one skilled in the art that the equivalent operations of storage at locations corresponding to variable time intervals and reacquisition from locations corresponding to a single time interval will produce an equivalent result within receive skew compensation system 1107. At least one embodiment in accordance with the invention encodes the received values as digital codes for storage in medium 1110. At least one embodiment in accordance with the invention performs the described operations using a software program executing on a processor, which may be a Digital Signal Processing device. At least one embodiment in accordance with the invention performs the operations in hard-coded Digital Signal Processing hardware.

Additional embodiments utilizing this aspect of the invention are possible. For example, the additional two wires may not carry any information, and always be at signal levels of ½ and −½, or vice-versa. As another example, the additional two wires may simply alternate ½ and −½ values, providing a reference clock to the receiver. Where the code on the original wires uses an alphabet of size a, and a is odd, a−1 pairs of additional wires may be added to the transmission lines wherein each pair carries complementary values and wherein these values may be additional values added to the alphabet leading to a transmission alphabet of size 2*a−1.

Skew Avoidance Utilizing Temporal Vector Signaling

Figure 12:
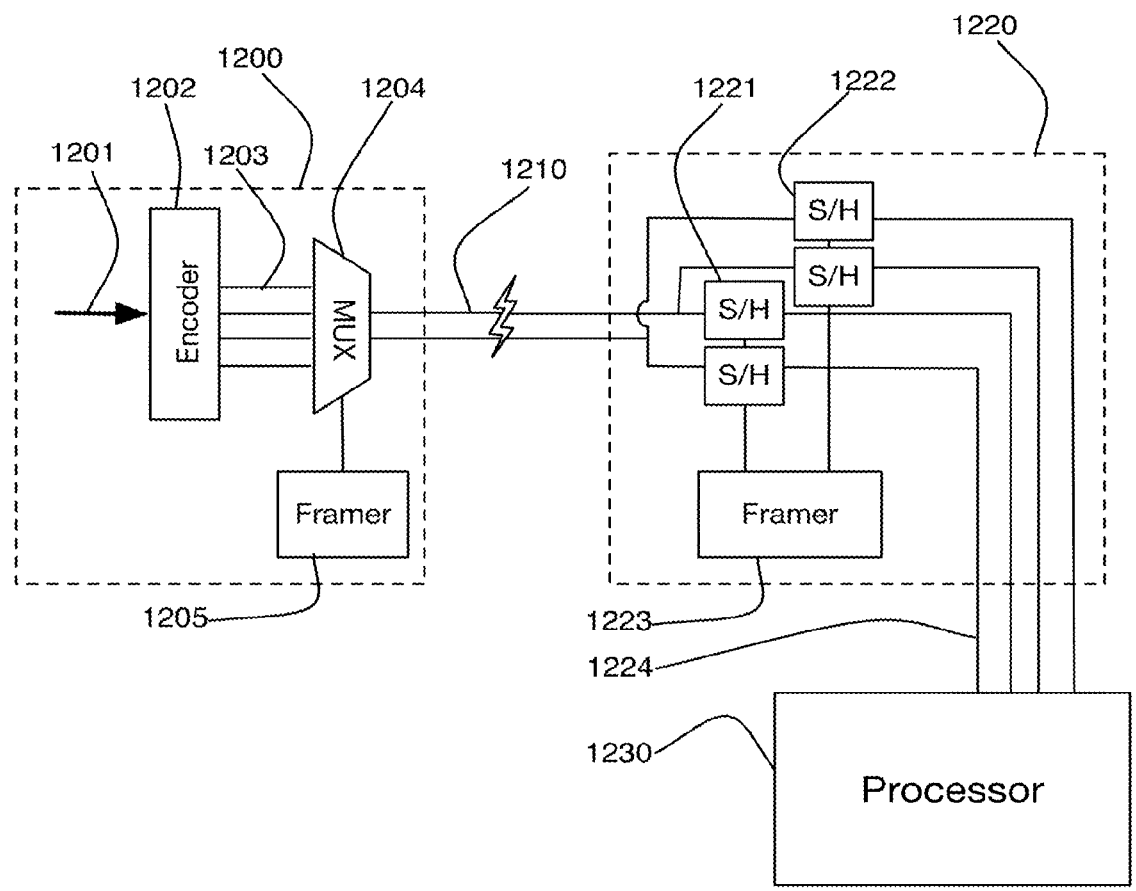
FIG. 12 is a block diagram of receive side skew avoidance using temporal signaling, in accordance with at least one embodiment of the invention.

In accordance with at least one embodiment of the invention, a vector signaled code may be communicated in the presence of inter-pair skew by having the transmitter send the symbols from a vector on fewer wires or wire pairs than there are symbols in successive time intervals. As one example, a receiver recovers the vector from successive samples transmitted on a single wire pair as shown in FIG. 12, a technique called temporal vector signaling. In transmitter 1200, data to be transmitted 1201 is encoded 1202 into codewords of a vector signaling code 1203. Under control of transmit framer 1205, symbols are selected 1204 from codeword 1203 for transmission over interconnection 1210, which has fewer wire connections than the number of codeword symbols. In receiver 1220, consecutive samples of incoming signals from interconnection 1210 are gathered in sample-and-hold circuits 1221 and 1222 under control of receive framer 1223, reassembling these gathered values into receive vector 1224 for subsequent processing 1230. As will be apparent to one of moderate skill, the previously presented teachings of temporal signaling and skew compensation utilizing pseudo-differential signaling may be applied here as well.

This detection in the presence of inter-pair skew assumes that a SubUIDS circuit has been employed in the receiver to align the receiver input data to the clock used by the subsequent circuit if more than two wires are used in the circuit and optionally if two wires are used.

It is observed that any form of vector signaling will have impaired high-frequency Receive-end Common-Mode Rejection (RxCMR) in the presence of skew. If a given embodiment must have some common mode rejection impairment, then it is acceptable to spread that impairment between its transmit and receive ends. This method spreads this high-frequency RxCMR impairment into a combination of Transmit-side Common-Mode Rejection (TxCMR) and RxCMR impairment. In some circuits, particularly chip to chip interconnect circuits, Common-Mode rejection is not the dominant requirement placed on the circuit. For example, in a situation where the pin-out and the semiconductor process node are both fixed and the chip to chip link is not overly long, by sending a vector signaling codeword over a pair of wires in time succession, the throughput can be greatly increased over the throughput possible with conventional differential signaling.

Said time-based receive side skew compensation circuit can also be used on code vectors of more than four symbols. The vector codes that employ six or eight symbols provide more throughput as compared to four symbols. The use of four analog samples has the property of keeping the cutoff frequency for the TxCMR and RxCMR impairment to the frequency that corresponds to just one symbol time of difference between the times that each pair of symbols was on the wire. The use of additional symbols lowers cutoff frequency for good TxCMR and RxCMR. The period over which the collective Simultaneous Switching Noise (SSN) is equal to 0 but in which the instantaneous SSN is not equal to zero, increases with the number of symbols. The imbalance caused by non-zero instantaneous SSN may cause additional power supply noise within both the transmitter and the receiver. Additionally, the electromagnetic interference emitted also gets worse as the number of signals increases.

Transmitter-Side Skew Compensation

In accordance with at least one embodiment of the invention, skew may be compensated at the transmitter through the use of a multiple-constraint encoder-decoder circuit, when both the transmitter and the receiver can agree on the inter-pair skew that the circuit is experiencing. This technique assumes that a SubUIDS circuit has been employed in the receiver to align the receiver input data to the clock used by the subsequent circuit. An encoder and decoder pair is used, which in some embodiments may have a higher complexity.

Figure 13:
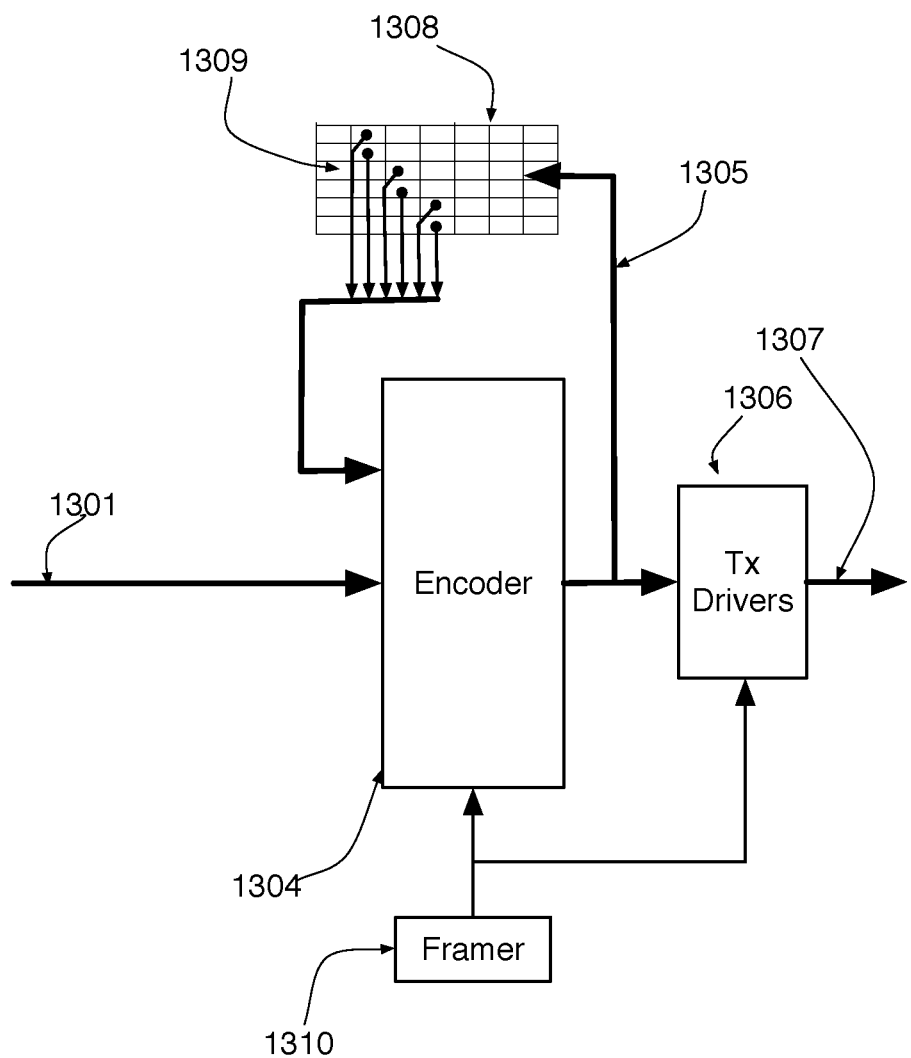
FIG. 13 is a block diagram of transmit side skew compensation in accordance with at least one embodiment of the invention.

The operation of the encoder is illustrated in FIG. 13. A storage device 1308 records each set of encoded values 1305 that are transmitted in a logical sequence corresponding to consecutive time intervals. When new transmit data 1301 arrives at encoder 1304, the encoder looks back in time within storage device 1308 the number of transmit intervals corresponding to the maximum skew that the signals will experience and determines what symbols 1309 were sent during that transmit interval on the wires that experience the maximum propagation delay as compared to the wires experiencing less propagation delay. Those previously sent symbols 1309 are combined with the current input 1301 to select new symbols that are to be sent on the channel 1305. Said new symbols must satisfy multiple constraints: Simultaneous Switching Noise (SSN) at the transmitter output must be within design constraints, the wire values obtained at the receiver must be detectable as symbols, and the codeword produced from symbols presented at the receiver must be capable of being decoding to obtain the data.

A receiver containing a storage device as previously described in FIG. 11 accepts the symbols from the channel and then waits the duration of the maximum wire skew to collect the symbols that were delayed by the channel. Said receiver then inputs the combination of the channel inputs and the delayed channel inputs to the decoder, which is designed so as to be capable of recovering the binary values that were input to the transmitter. As will be apparent to one of moderate skill in the art, compensation for differing amounts of delay over various components of the communications path may be applied at the transmitter, the receiver, or some negotiated combination of both, so as to optimize the described multiple constraints.

Throughput-Balancing Encoder-Decoder Pair

In accordance with at least one embodiment of the invention, the available codewords that meet all of the constraints are unequally distributed throughout the range of possible codewords resulting in an unequal throughput for the encoder-decoder pair. In the absence of an additional circuit, this type of circuit would not be able to deliver a predictable throughput to the circuit utilizing the link.

However, in certain situations, the throughput of the next time period after each possible symbol that can be send during this time period is known at design time. In one embodiment, an additional throughput balancing encoder-decoder pair is used, which assigns more selective input codewords to choices that will lead to lower throughput on the next clock and less selective input codewords to choices that will lead to higher throughput on the next clock. The decoder reverses this process.

Said throughput-balancing encoder-decoder pair can be implemented such that the throughput is constant or roughly constant, independent of what the input data is.

Example Throughput Balancing Encoder-Decoder

An example throughput-balancing encoder-decoder pair in accordance with at least one embodiment of the invention operates as follows: Let us say that we need to transmit three bits of information each time period. Because of the combined effects of the various constraints on the transmitter, if we send either a 000b or a 111b in this time period, we will only be able to send two bits of information next time period, but we will be able to send at least three bits on the time period after that. If we send either a 011b or 100b this period, we will be able to send four bits of information next time period. If we send any of the four other code words this period, we will be able to send three bits of information during the next period. For each of the last two cases, the number of bits of information that can be sent during the time period after the next time period depends on what information is sent.

To handle this situation, the encoder accepts six bits every two time periods, following this algorithm:

When we can send two bits: send two of the input bits.

When we can send three bits, send four of the input bits as follows:

Input code word 0000b is mapped to line code word 000b (four bits worth).

Input code words 0001b and 0010b are mapped to line code word 001b (three bits worth).

Input code words 0011b and 0100b are mapped to line code word 010b (three bits worth).

Input code words 0101b, 0110b and 0111b are mapped to line code word 011b (a little more than two bits worth).

Input code words 1000b, 1001b and 1010b are mapped to line code word 100b (a little more than two bits worth).

Input code words 1011b and 1100b are mapped to line code word 101b (three bits worth).

Input code words 1101b and 1110b are mapped to line code word 110b (three bits worth).

Input code words 1111b is mapped to line code word 111b (four bits worth).

When we can send four bits: send four of the input bits.

With this balancing coder, we send more information in the case that during the next period that we will be able to send less next time. Similarly, we send less information during this period in the case that we will be able to send more next period.

Example Embodiment Utilizing Transmitter-Side Skew Compensation and a Throughput Balancing Coder In accordance with at least one embodiment of the invention, a specific example is given where four bits are transmitted over four wires, leading to a pin-efficiency of 1. The transmitter of this example uses an encoder as shown in FIG. 13, and the receiver uses a decoder as shown in FIG. 11. The other characteristics of this example are:

1) Uses a digital coder-decoder pair
2) Uses a vector signaling code that is the union of two ternary codes with the following properties: for the first code, the sum of all values in each codeword is +1. For the second code, the sum of all values in each codeword is −1.
3) Incorporates a receiver that can distinguish between these two codes, for example by means of multi-input comparators as previously described in FIGS. 1A, 1B and FIG. 3.
4) Incorporates receiver analog compensation for up to 1 symbol-time of skew (SubUIDS.)
5) Allows 2 wires of the group to have a large multi-bit skew that both the Tx and Rx agree on in advance.
6) Supports a constrained transmit SSO from −2 to +2, which can optionally be compensated by adding two extra drivers to the circuit that are connected to on-die capacitors or other active circuits that simulate the load of a line, as described in Holden I.
7) Optionally supports inclusion of a self-synchronizing scrambler and auxiliary functions, as described earlier.

The codec pair operates as follows:

1) Wires A & B are both skewed by the channel by N UIs.
2) At boot-time, the link measures the skew on the link.
3) The configuration software configures both ends of the link with the value of the measured skew.
4) The encoder in the transmitter keeps a running history of all of the digital versions of all of the ternary values that it sent on wires A and B over the entire N UI interval.
5) On each clock, four new (binary) bits arrive at the encoder.
6) The encoder looks back N UIs and determines what ternary values it sent on wires A and B.

7) It puts those two ternary values plus the four new bits into an encoder that produces the four new ternary values to send on this clock. This encoder can be memory- or logic-based.
8) The values in the encoder satisfy two constraints simultaneously. The first constraint is that the transmitter (pre-skew) analog sum (SSO) of any of the transmitted codewords is constrained within the defined bounds (+2 to −2). The second constraint is that the receiver (post-skew) analog sum of the received words must be either +1 or −1.
9) The four ternary values that the encoder produces are put on the four wires of the link.
10) The channel skews the values on wires A and B by N UIs to line up with the most recent values on wires C and D.
11) The receiver implements an analog de-skew function (SubUIDS) to align all of the values onto the same clock period.
12) The receiver implements a detection circuit on the four wires, A, B, C and D.
13) The receiver also does an analog slice of the analog sum of the differences between the wires in order to distinguish between codes in the +1 sum and −1 sum codeword sets.
14) The bit determined from this analog slice is combined with the voting results to determine the digitized representation of the four ternary values that were on the line.
15) The receiver stores the four digitized ternary values for the wires for N clocks.
16) The receiver puts the four stored digitized ternary values and the two new digitized ternary values obtained from wires A and B into a memory-based (or logic-based) decoder and recovers the original four binary bits.

We proceed with an example. In this example, the code C is the union of the permutation modulation codes generated by the vector (1,1,0,−1) and (−1,−1,0,1) minus the four codewords (0,−1,1,1), (−1,0,1,1), (1,0,−1,−1), and (0,1,−1,−1) having the same last two entries. This code has 20 codewords. The codewords in this code are denoted by $(A_i|B_i)$ where $A_i$ denotes the first two coordinates of the codewords, and $B_i$ denotes the last two coordinates. We assume that after the 0 through 1 UI de-skew, the values on the second set of wires arrive t UI's after the values transmitted on the first pair of wires. In other words, if a codeword $(A_i|B_i)$ is transmitted at time i, then the vector $(A_i|B_{i-t})$ is received at time i. This notation assumes that the reference wire pair has less propagation delay than other wires, but this assumption is only meant to make the subsequent description easier. Anyone with moderate skill in the art will be able to modify the description to account for propagation delays on the other wires that are either greater or less than that of the reference pair.

According to the description above, for all time instances i, the vector $(A_i|B_{i-t})$ needs to be an element in the code. Moreover, since at time i the vector $(A_i|B_i)$ is sent on the wires, the sum of the entries in the vector A plus the sum of the entries in the vector B, should be between −2 and 2. Since at the time of transmission of the vector $(A_i|B_i)$ the value of $B_{i-t}$ is already fixed, the coding problem becomes the following: Given $B_{i-t}$ find at least 16 pairs $(A_i|B_i)$ such that $(A_i|B_{i-t})$ is a codeword and the sum of the entries of the vector $(A_i|B_i)$ is between −2 and 2. It is indeed possible to find, for any given $B_{i-t}$ 16 such pairs. This is demonstrated in Table 4, where for ease of notation a "1" is denoted by "+", and a "−1" is denoted by "−".

TABLE 4 codewords of the example

| $B_{i-t}$ | Possible $(A_i|B_i)$ | Number of possible pairs |
|---|---|---|
| 0+ | −+0+, −+0−, −++0, −+−0, −+−+, −++−, +−0+, +−0−, +−+0, +−−0, +−−+, +−+−, −−0+, −−+0, −−−+, −−+− | 16 |
| 0− | +−0+, +−0−, +−+0, +−−0, +−−+, +−+−, −+0+, −+0−, −++0, −+−0, −+−+, −++−, ++0−, ++−0, ++−+, +++− | 16 |
| +0 | −+0+, −+0−, −++0, −+−0, −+−+, −++−, +−0+, +−0−, ++0, +−−0, +−−+, +−+−, −−0+, −−+0, −−−+, −−+− | 16 |
| −0 | +−0+, +−0−, +−+0, +−−0, +−−+, +−+−, −+0+, −+0−, −++0, −+−0, −+−+, −++−, ++0−, ++−0, ++−+, +++− | 16 |
| ++ | 0−0+, 0−0−, 0−+0, 0−−0, 0−−+, 0−+−, −00+, −00−, −0+0, −0−0, −0−+, −0+−, 0+0+, 0+0−, 0+0, 0++−, 0+−+, 0+−, +0−+, +0+− | 24 |
| −− | 0+0+, 0+0−, 0++0, 0+−0, 0+−+, 0++−, +00+, ++0, +0−0, +0−+, +0+−, 0−0+, 0−0−, −+0, 0−−0, 0−−+, 0−+−, −00+, −00−, −0+0, −0−+, −0+− | 24 |

Said transmitter acts without waiting by looking back the N clocks to see what was put on wires A and B, and then combines that with the new binary values that were input in order to come up with the new ternary values. The receiver waits the full duration of the skew and combines the stored post-skew voting results on all of the wires together with the latest voting results on the wires that were skewed. The combination of these six ternary values is enough to recover the four input binary values.

The unique part of the encoder design is its triple-constraint nature. Each value that the encoder puts on the wires must satisfy all of the following constraints simultaneously: the encoder's local pre-skew SSN constraint, the receiver's post-skew code-set constraint, and the encoding requirements for the data being communicated.

Figure 14:
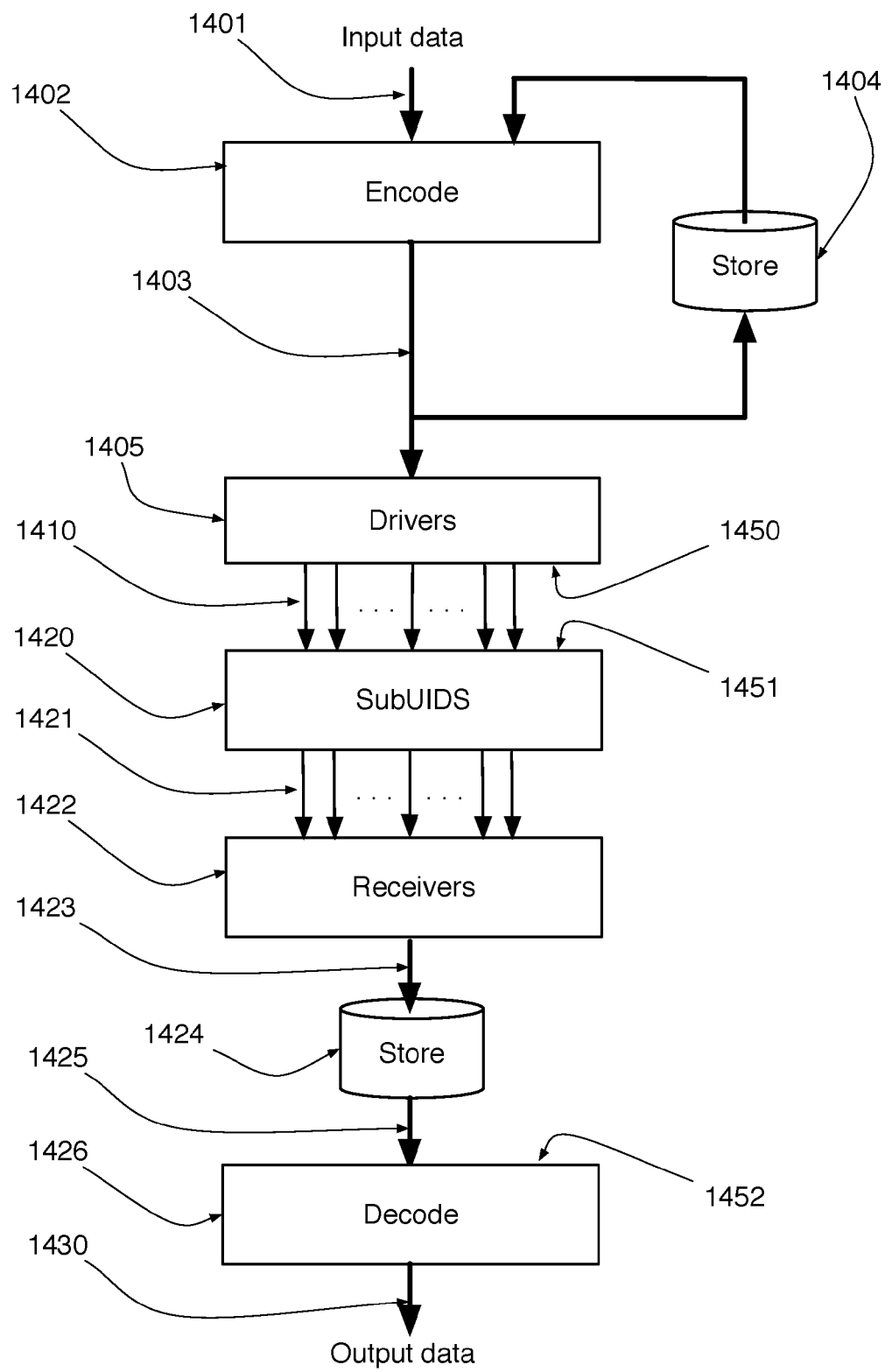
FIG. 14 is a flow chart showing the operation of a throughput-balancing encoder decoder pair, in accordance with at least one embodiment of the invention.

This example is illustrated in FIG. 14 in accordance with at least one embodiment of the invention. Input data 1401 is presented to vector signaling code encoder 1402, producing sets of symbols 1403 that are codewords of the vector signaling code. These symbols are also stored 1404, with symbols retrieved from storage becoming further inputs to encoder 1402.

Channel transmit drivers 1405 convert symbols 1403 into physical signals which are sent over the multiple channels of communications media 1410 at transmission interface 1450.

Channel receivers 1422 detect the physical signals received over the multiple channels of communications media 1410 at reception interface 1451, producing receive symbols 1423.

Because of differing propagation delays among the multiple channels, the set of symbols received simultaneously at reception interface 1451 may not correspond with the set of symbols that were transmitted simultaneously at transmission interface 1450. SubUIDS circuit 1420 corrects up to one symbol transmission interval of reception time variation, by introducing small individually adjustable delays between each channel input 1410 and each SubUIDS output 1421. The clock-aligned received signals from SubUIDS outputs 1421 are detected by receivers 1422 producing receive symbols 1423. This detection process is facilitated by having channel outputs 1421 synchronized to a common receive clock by action of SubUIDS circuit 1420.

The remainder of the differential channel reception delay is corrected as receive symbols 1423 are stored 1424 for a period equal to the longest relative propagation delay of the multiple channels 1410. Stored receive symbols are then retrieved 1425 and presented to decoder 1426 to produce output data 1430.

Vector signaling code encoder 1402 operates under multiple constraints. The symbols it produces must satisfy all of the criteria:

1. the set of physical signals simultaneously transmitted at transmission interface 1450 may not exceed the predefined simultaneous switching output limit.
2. the set of physical signals simultaneously received at reception interface 1451 must be capable of unambiguous interpretation as symbols of the vector signaling code.
3. The set of stored receive symbols presented 1452 to decoder 1424 must represent a valid codeword of the vector signaling code which can be unambiguously decoded to output data.

To enable these criteria to be satisfied, store 1404 provides previously transmitted symbols to encoder 1402, allowing the encoder to select symbols that immediately satisfy criterion 1, and which after experiencing the various propagation delays of multiple channels 1410, will satisfy criterion 2. Store 1424 allows decoder 1426 to combine symbols, including those received at different times over different channels, to produce a time-coherent codeword satisfying criterion 3.

The examples presented herein illustrate the use of vector signaling codes for point-to-point wire communications. However, this should not been seen in any way as limiting the scope of the described invention. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

Interpreting a set of signals as selecting an object (e.g., a data object) can include selecting the object based at least in part on the set of signals and/or one or more attributes of the set of signals. Interpreting a set of signals as representing an object (e.g., a data object) can include determining and/or selecting the object based at least in part on a representation corresponding to the set of signals. A same set of signals may be used to select and/or determine multiple distinct objects (e.g., data objects).

The invention claimed is:

1. A method comprising:
    receiving a set of input bits;
    obtaining a measured skew between a first set of wires of a multi-wire bus and a second set of wires of the multi-wire bus;
    obtaining a set of previously-transmitted symbols based on the obtained measured skew, the set of previously-transmitted symbols transmitted on the second set of wires of the multi-wire bus;
    selecting a set of transmit symbols based on the set of previously-transmitted symbols and the received set of input bits, the set of transmit symbols selected from a group of sets of transmit symbols, the group of sets being identified by the set of previously-transmitted symbols, the set of transmit symbols selected from the identified group of sets according to the set of input bits, wherein (i) a subset of the set of transmit symbols concatenated with (ii) the set of previously-transmitted symbols represent symbols of a valid codeword of a skew-tolerant vector signaling code; and
    transmitting the set of transmit symbols as signals over a multi-wire bus, wherein the subset of the set of transmit symbols is transmitted on the first set of wires of the multi-wire bus.

2. The method of claim 1, wherein a sum of the set of transmit symbols is less than a predetermined constant.

3. The method of claim 1, wherein a sum of the symbols of the valid codeword is less than a predetermined constant.

4. The method of claim 1, wherein the skew-tolerant vector signaling code is a permutation modulation code.

5. The method of claim 4, wherein the permutation modulation code comprises codewords generated from a first basis vector (1, 1, 0, −1) and a second basis vector (−1, −1, 0, 1).

6. The method of claim 1, wherein the set of previously-transmitted symbols comprises a pair of symbols.

7. The method of claim 6, wherein the pair of symbols comprises two different symbol values.

8. The method of claim 1, further comprising storing the set of transmit symbols.

9. The method of claim 8, wherein the set of transmit symbols of stored for a duration of greater than or equal to the measured skew.

10. The method of claim 1, wherein each of the first and second sets of wires of the multi-wire bus are wire pairs.

11. The method of claim 1, wherein the set of previously-transmitted symbols are obtained from a storage device.

12. A method comprising:
    sequentially obtaining two or more valid codewords of a skew-tolerant code at a receiver, the two or more valid codewords comprising a first valid codeword and a second valid codeword, each of the two or more valid codewords comprising a corresponding set of received symbols, wherein for each of the two or more sequentially obtained valid codewords, the corresponding set of received symbols comprises at least a first pair of received symbols were transmitted in a signaling interval prior to a signaling interval of at least a second pair of received symbols;
    generating a corresponding digitized representation for each received symbol of each of the corresponding sets of received symbols of the two or more sequentially obtained valid codewords, and responsively storing the digitized representations;
    selecting, according to a predetermined measured skew, a set of the digitized representations from the stored digitized representations, the set of digitized representations comprising (i) digitized representations of a subset of received symbols of the first valid codeword and (ii) digitized representations of a subset of received symbols of the second valid codeword, wherein the first and second valid codewords were received in signaling intervals differing by the predetermined measured skew; and
    decoding the selected set of digitized representations to obtain information bits.

13. The method of claim 12, wherein the obtaining of each of the two or more sequentially obtained valid codewords comprises obtaining voltage samples from a sub-interval skew correction circuit.

14. The method of claim 12, wherein the digitized representations of the symbols of the corresponding sets of symbols of each of the two or more sequentially obtained valid codewords are formed in part using analog summation circuits operating on the symbols of each of the two or more sequentially obtained valid codewords.

15. The method of claim 14, wherein the analog summation circuits are multi-input comparators, each multi-input comparator having a unique set of input coefficients, wherein the multi-input comparators fully identify the received symbols of the corresponding sets of symbols of each of the two or more sequentially obtained valid codewords.

16. The method of claim 12, wherein the predetermined measured skew corresponds to skew between respective pairs of wires of a multi-wire bus.

17. The method of claim 12, wherein the skew-tolerant code is a permutation modulation code.

18. The method of claim 17, wherein the permutation modulation code comprises codewords generated from a first basis vector (1, 1, 0, −1) and a second basis vector (−1, −1, 0, 1).

19. The method of claim 12, wherein the digitized representations of the subset of the received symbols of the first valid codeword comprises digitized representations of all of the received symbols of the first valid codeword.

20. The method of claim 12, wherein each valid codeword of the two or more sequentially obtained valid codewords is stored for a duration of at least the predetermined measured skew.

* * * * *